United States Patent
Weber et al.

(10) Patent No.: US 10,929,927 B2
(45) Date of Patent: Feb. 23, 2021

(54) EXCHANGE TRADING OF MUTUAL FUNDS OR OTHER PORTFOLIO BASKET PRODUCTS

(71) Applicant: NYSE MKT LLC, New York, NY (US)

(72) Inventors: Clifford J. Weber, Basking Ridge, NJ (US); Gary L. Gastineau, Short Hills, NJ (US)

(73) Assignee: NYSE American LLC, New York, NY (US)

(*) Notice: Subject to any disclaimer, the term of this patent is extended or adjusted under 35 U.S.C. 154(b) by 686 days.

(21) Appl. No.: 14/822,198

(22) Filed: Aug. 10, 2015

(65) Prior Publication Data

US 2015/0348193 A1    Dec. 3, 2015

Related U.S. Application Data

(63) Continuation of application No. 14/788,931, filed on Jul. 1, 2015, which is a continuation of application No. 13/445,164, filed on Apr. 12, 2012, now abandoned, which is a continuation of application No. 10/753,069, filed on Jan. 8, 2004, now Pat. No. 8,170,934, which is a continuation-in-part of application No. 10/174,505, filed on Jun. 17, 2002, now Pat. No. 7,571,130, and a continuation-in-part of application No. 10/123,779, filed on Apr. 16, 2002, now Pat. No. 7,305,362, and a continuation-in-part of application No. 09/815,589, filed on Mar. 23, 2001, now Pat. No. 7,970,687, which is a continuation of application No. 09/536,258, filed on Mar. 27, 2000, (Continued)

(51) Int. Cl.
G06Q 40/04 (2012.01)

(52) U.S. Cl.
CPC ................... *G06Q 40/04* (2013.01)

(58) Field of Classification Search
CPC ....................................... G06Q 40/04
USPC ................... 705/35, 36 R, 36 T, 37
See application file for complete search history.

(56) References Cited

U.S. PATENT DOCUMENTS

| 5,101,353 A | 3/1992 | Lupien et al. |
| 5,121,337 A | 6/1992 | Brown |

(Continued)

FOREIGN PATENT DOCUMENTS

| EP | 0 434 877 | 7/1991 |
| WO | 96/18963 | 6/1996 |

(Continued)

OTHER PUBLICATIONS

Refenes (IEEE Transactions on Neural Networks, vol. 8, No. 6,, "Neural networks in financial engineering: a study in methodology", Nov. 1, 1997, pp. 1222-1267).*

(Continued)

*Primary Examiner* — Gregory A Pollock
(74) *Attorney, Agent, or Firm* — DLA Piper LLP (US)

(57) ABSTRACT

Embodiments include systems and methods for intra-day trading of actively managed exchange traded funds (AMETFs). The embodiments provide creation and redemption structures for AMETF shares that allow arbitrage, intra-day value estimations for AMETF shares, and hedging portfolios for hedging risks associated with trading AMETF shares, all without requiring disclosure of the specific assets underlying the AMETF.

32 Claims, 7 Drawing Sheets

Related U.S. Application Data now Pat. No. 7,099,838, said application No. 10/753,069 is a continuation-in-part of application No. 09/536,663, filed on Mar. 27, 2000, now Pat. No. 6,941,280.

(56) References Cited

U.S. PATENT DOCUMENTS

| | | |
|---|---|---|
| 5,148,365 A | 9/1992 | Dembo |
| 5,214,579 A | 5/1993 | Wolfberg et al. |
| 5,351,296 A | 9/1994 | Sullivan |
| 5,658,423 A | 8/1997 | Angell et al. |
| 5,761,442 A | 6/1998 | Barr et al. |
| 5,765,165 A | 6/1998 | Harper |
| 5,799,287 A * | 8/1998 | Dembo ............... G06Q 40/08 |
| | | 705/36 R |
| 5,806,048 A | 9/1998 | Kiron et al. |
| 5,812,988 A | 9/1998 | Sandretto |
| 5,819,238 A | 10/1998 | Fernholz |
| 5,873,071 A | 2/1999 | Ferstenberg et al. |
| 5,875,437 A | 2/1999 | Atkins |
| 5,930,762 A | 7/1999 | Masch |
| 5,937,159 A | 8/1999 | Meyers et al. |
| 5,950,173 A | 9/1999 | Perkowski |
| 5,987,435 A | 11/1999 | Weiss et al. |
| 6,003,018 A | 12/1999 | Michaud et al. |
| 6,047,270 A | 4/2000 | Joao et al. |
| 6,061,662 A | 5/2000 | Makivic |
| 6,061,663 A | 5/2000 | Bloom et al. |
| 6,084,528 A | 7/2000 | Beach et al. |
| 6,088,685 A | 7/2000 | Kiron et al. |
| 6,108,648 A | 8/2000 | Lakshmi et al. |
| 6,111,255 A | 8/2000 | Malins |
| 6,205,439 B1 | 3/2001 | Gardner |
| 6,244,986 B1 | 6/2001 | Mori et al. |
| 6,275,814 B1 | 8/2001 | Glansante et al. |
| 6,304,858 B1 | 10/2001 | Mosler et al. |
| 6,317,728 B1 | 11/2001 | Kane |
| 6,321,212 B1 | 11/2001 | Lange |
| 6,360,210 B1 | 3/2002 | Wallman |
| 6,456,982 B1 | 9/2002 | Pilipovic |
| 6,377,907 B1 | 11/2002 | Waclawski |
| 6,584,502 B1 | 6/2003 | Natarajan et al. |
| 6,606,615 B1 | 8/2003 | Jennings et al. |
| 6,832,209 B1 | 12/2004 | Karp et al. |
| 6,832,210 B1 | 12/2004 | Li |
| 7,085,738 B2 | 8/2006 | Tarrant |
| 7,103,569 B1 | 9/2006 | Groveman et al. |
| 7,206,760 B1 | 4/2007 | Carey et al. |
| 7,349,878 B1 | 3/2008 | Makivic |
| 7,668,773 B1 | 2/2010 | Pruitt |
| 2001/0025266 A1 | 9/2001 | Gastineau et al. |
| 2002/0002521 A1 | 1/2002 | Shearer et al. |
| 2002/0007329 A1 | 1/2002 | Alcaly et al. |
| 2002/0082966 A1 | 6/2002 | O'Brien et al. |
| 2002/0091616 A1 | 7/2002 | Bloom et al. |
| 2002/0099640 A1 | 7/2002 | Lange |
| 2002/0120542 A1 | 8/2002 | Higgins |
| 2002/0143676 A1* | 10/2002 | Kiron ............... G06Q 40/00 |
| | | 705/35 |
| 2002/0147671 A1 | 10/2002 | Sloan et al. |
| 2002/0178111 A1 | 11/2002 | Woodley |
| 2002/0184126 A1 | 12/2002 | McIntyre, Jr. et al. |
| 2003/0014343 A1 | 1/2003 | Jones |
| 2003/0065602 A1 | 4/2003 | Yip |
| 2003/0126062 A1 | 7/2003 | Gilbert et al. |
| 2003/0139993 A1 | 7/2003 | Overy et al. |
| 2003/0144947 A1* | 7/2003 | Payne ............... G06Q 40/04 |
| | | 705/37 |
| 2003/0177084 A1 | 9/2003 | Cassini et al. |
| 2004/0044505 A1 | 3/2004 | Horwitz |
| 2004/0049448 A1 | 3/2004 | Glickman |
| 2004/0059621 A1 | 3/2004 | Jameson |
| 2004/0215551 A1 | 10/2004 | Eder |
| 2005/0027634 A1 | 2/2005 | Gershon |
| 2005/0027638 A1 | 2/2005 | Ng et al. |
| 2005/0108134 A1 | 5/2005 | Harlow et al. |
| 2005/0137969 A1* | 6/2005 | Shah ............... G06Q 40/06 |
| | | 705/39 |
| 2009/0063363 A1 | 3/2009 | Present et al. |
| 2010/0057608 A1 | 3/2010 | McPherson |

FOREIGN PATENT DOCUMENTS

| | | |
|---|---|---|
| WO | 02/084435 | 10/2002 |
| WO | 02/084435 A2 | 10/2002 |
| WO | 02/091109 | 11/2002 |
| WO | 03/001325 | 3/2003 |
| WO | 03/036533 | 5/2003 |
| WO | 03/083616 | 10/2003 |
| WO | 01/03046 | 11/2004 |

OTHER PUBLICATIONS

Hoffman, D, A Solution in a Search of a Problem? Advisors Shug at AMEX's plan to develop actively managed ETFs, Jul. 12, 2004, Investment News, pp. 1-5.

Thomas Media Inc., "Actively Managed ETFs on Horizon," Jun. 28, 2004, Securities Industry News, pp. 1-4.

Benjamin, J., "Managed ETFs may invade US: After European Tryout, SEC Approval Sought," Jan. 8, 2001, Investment News, pp. 1-4.

Kang, Richard C., "A New Paradigm for Portfolio Construction," Canadian Hedge Watch, vol. 4, Issue 5, Oct.-Nov. 2004.

Kat et al., "Hedge Fund Returns: You Can Make them Yourself," Fall 2005.

Fung et al., Hedge Fund Benchmarks: A Risk-Based Approach, Sep./Oct. 2004.

Dor et al., Understanding Mutual Fund and Fledge Fund Styles Using Return Based Style Analysis, Aug. 2002.

Sharpe, et al., "Asset Allocation: Management Style and Performance Measurement," Winter 1992.

Dembo, Ron S., "Scenario Optimization," Annals of Operations Research, vol. 30, pp. 63-80, 1991.

Business Week, "New Exchange Funds: Not Just Spiders and WEBS," Nov. 15, 1999.

Robinson, S., "INVESTING; AMEX Considers Mutual Fund Trading," NYT, Sep. 9, 1999.

Dembo, et al., "Tracking Models and the Optimal Regret Distribution in Asset Allocation," Applied Stochastic Models and Data Analysis, (8) pp. 151-157, 1992.

Gibbons, M., et al., Testing Asset Pricing Models with Changing Expectations and an Unobservable Market Portfolio, Journal of Financial Economics (14) pp. 217-236, 1985.

Cheng, D.C., "Principal Component Estimators in Regression Analysis," The Review of Economics and Statistics, 58 (2), May 1976, pp. 229-234.

Chan, et al., "On Portfolio Optimization: Forecasting Covariances and Choosing the Risk Mode," The Review of Financial Studies, 12 (5), Winter 1999, pp. 937-974.

Cheong, "A Test of the Multi-Factor Asset Pricing Model with the ASA-NBER Macroeconomic Forecasts," Dissertation, State University of New York at Albany, 1988.

Grep, Ip, "Blind Bids Become Popular in Big Trades," Wall Street Journal, Aug. 14, 1997.

Flury, Bernard, "Common Principal Components and Related Multivariate Models," Department of Mathematics, Indiana University, Bloomington, Indiana, Copyright 1988 by John Wiley & Sons, Inc., pp. 1-258.

B.A. Rosenberg, "Extra-Market Components of Covariance in Security Returns," Journal of Financial and Quantitative Analysis 9 (1973), pp. 263-274.

Schneeweiss et al., "Factor Analysis and Principal Components," Journal of Multivariate Analysis, vol. 55, pp. 105-124 (1995).

Donald R. Lessard, "International Portfolio Diversification: A Multivariate Analysis for a Group of Latin American Countries," The Journal of Finance, vol. 28, No. 3 (Jun. 1973), pp. 619-633.

(56) References Cited

OTHER PUBLICATIONS

C. Alexander et al., "Market Models: A Guide to Financial Data Analysis," 2001, pp. 143-178.
Gur Huberman et al., "Mimicking Portfolios and Exact Arbitrage Pricing," The Journal of Finance, vol. 42, No. 1 (Mar. 1987), pp. 1-9.
Elton, et al., "Modern Portfolio Theory, 1950 to Date," Journal of Banking & Finance, vol. 21, Issues 11-12, Dec. 1997, pp. 1743-1759.
Traders, "Principal Blind Bidding in Portfolio Trading," No. 143, vol. 11, p. NA, ISSN: 0894-7295, Sep. 1998, pp. 1-3.
Gopikrishnan, P., "Quantifying and Interpreting Collective Behavior in Financial Markets," Physical Review E., vol. 64, 035106®, pp. 1-4, Aug. 30, 2001.
Gregory Connor et al., "Risk and Return in an Equilibrium Apt.," Journal of Financial Economics, 21 (1988), North-Holland, pp. 255-289.
Carol Alexander, et al., "Sources of Over-Performance in Equity Markets: Mean Reversion, Common Trends and Herding," ISMA Centre Discussion Papers in Finance DP2003-08, Oct. 2003, pp. 3-31.
Feeney, "Stock Market Indices: A Principal Components Analysis," Cowles Foundation for Research in Economics at Yale University, Monograph 19, pp. 110-138.
Louis K.C. Chan et al., "The Risk and Return from Factors," The Journal of Financial and Quantitative Analysis, vol. 33, No. 2 (Jun. 1998), pp. 159-188.
Lehman et al., "Mutual Fund Performance Evaluation: A Comparison of Benchmark and Benchmark Comparison," Journal of Finance, vol. 2, No. 2, Jun. 1987, pp. 235-238.
Greene, "New Products: Amex Plans Active Exchange-Traded Fund," Aug. 21, 2000, Investment Management Weekly, New York, p. 1.
Communication Pursuant to Article 96(2) EPC, dated Apr. 5, 2006.
Gregory Connor, "The Three Types of Factor Models: A Comparison of Their Explanatory Power," pp. 1-7.
Gregory Connor et al., "The Arbitrage Pricing Theory and Multifactor Models of Asset Returns," Sep. 1992, Forthcoming in Finance Handbook, pp. 1-94.
M. A. Berry, et al., "Sorting Out Risks Using Known APT Factors," Financial Analysis Journal 22 (1988), pp. 29-42.
Chen et al., "An Exploratory Investigation of the Firm Size Effect," Journal of Financial Econ. 14 (1985), pp. 451-471.
S. Beckers et al., "The Relative Importance of Common Factors Across the European Equity Markets," Journal of Banking and Finance 16 (1992), pp. 75-97.

J. K. Kale et al., "Industry Factors versus Other Factors in Risk Prediction," Working Paper University of California, Berkeley (1991).
E.F. Fama et al., Common Risk Factors in the Returns of Stocks and Bonds, Journal of Financial Econ. 33 (1992), pp. 3-56.
B. Lehman et al., "The Empirical Foundation of the Arbitrage Pricing Theory," Journal of Financial Econ. 21 (1988), pp. 213-254.
G. Connor et al., "A Test for the Number of Factors in an Approximate Factor Model," Journal of Finance 48 (1993), pp. 1263-1292.
The Economist, "Science and Technology: Digital Rights and Wrongs," Jul. 17, 1999, pp. 75-76.
"HCM Global Technology Fund Limited: Investment Statement," available at www.fnatasy.co.nz/brokerage /hcm/tech-is.pdf (available on or after Jun. 1, 1999).
B. Rosenberg, "Extra-Market Components of Covariance Among Security Prices," Research Program in Finance Working Paper RPF-013, 1973, pp. 1-45.
B. Rosenberg, "Common Factors in Security Returns: Microeconomic Determinants and Macroeconomic Correlates," Seminar on the Analysis of security Prices, May 13-14, 1976.
Carol Alexander, "A Guide to Financial Data Analysis," published by John Wiley & Sons, Ltd., 2001, pp. 143-178.
K. Pearson, On Lines and Planes of Closest Fit to Systems of Points in Space, Philosophical Magazine and Journal of Science, vol. 2, Sixth Series, Jul.-Dec. 1901, pp. 559-572.
"Could Exchange Traded Funds Be Right for You," Ameritrade Exchange-Traded Funds-ETC Center: World Wide Web, 2004, pp. 1-2.
"Explore the Essentials of EFTs," Ameritrade Exchange-Traded Funds-ETC Center: Education: World Wide Web, 2004, pp. 1-4.
SEC Concept Release: Actively Managed Exchange-Traded Funds; http://www.sec.gov/rules/concept/ic-25258.htm; last visited Aug. 24, 2004.
"Mopex Ups Ante in ETF Patent Challenge," MAR Headlines, In Business, last visited on Apr. 25, 2002.
"Gregory Aharonian on Open End Mutual Fund Securitization Process Patent," Randon-bits, last visited Apr. 25, 2002, pp. 1-4.
Gregg Greenberg, "What's Next for ETFs?," The Street.com, pp. 1-2.
T. Laswing, "Active ETF Inching Toward Reality," Ignites.com, Jun. 10, 2004.
T. Bernard, "Getting Personal: Active ETF Filing May Be on Horizon," Dow Jones News Service, Jun. 23, 2004.
I. Clary, "Actively Managed ETPs on Horizon," Securities Industry News, Copyright(c) Thomson Media Inc., Jun. 28, 2004.
"Vanguard SEC Exemptive Application," dated Jul. 12, 2000, pp. 1-88.

\* cited by examiner

EXCHANGE TRADING OF MUTUAL FUNDS OR OTHER PORTFOLIO BASKET PRODUCTS

CROSS REFERENCE TO RELATED APPLICATIONS

This is a Continuation application of prior application U.S. patent application Ser. No. 14/788,931, filed Jul. 1, 2015; which is a Continuation application of U.S. patent application Ser. No. 13/445,164, filed Apr. 12, 2012; which is a Continuation application of prior co-pending U.S. patent application Ser. No. 10/753,069 (now U.S. Pat. No. 8,170, 934), filed Jan. 8, 2004, which is a Continuation-In-Part of U.S. patent application Ser. No. 10/174,505 (U.S. Pat. No. 7,571,130), filed Jun. 17, 2002, a Continuation-In-Part of U.S. patent application Ser. No. 10/123,779 (now U.S. Pat. No. 7,305,362), filed Apr. 16, 2002, a Continuation-In-Part of U.S. patent application Ser. No. 09/815,589 (now U.S. Pat. No. 7,970,687), filed Mar. 23, 2001, a Continuation of U.S. patent application Ser. No. 09/536,258 (now U.S. Pat. No. 7,099,838), filed Mar. 27, 2000, and a Continuation-In-Part of U.S. patent application Ser. No. 09/536,663 (now U.S. Pat. No. 6,941,280), filed Mar. 27, 2000, all the contents of which are hereby incorporated by reference.

FIELD OF THE INVENTION

This invention relates to systems and methods to allow public intra-day trading of financial instruments such as shares of actively managed funds on secondary markets without knowledge of the specific assets underlying the traded instruments.

BACKGROUND

Mutual funds allow investors to trade in a variety of assets in a single investment vehicle. For example, a mutual fund may comprise shares of stocks of many different companies. Mutual funds may also be comprised of one or more types of financial instruments—stocks, bonds, options, futures, etc. —and may involve securities from diverse industries. Mutual funds provide the benefit of investment diversification without requiring investment expertise or extensive knowledge about the underlying assets. Furthermore, investors can benefit from professional experience when they hold actively managed funds ("AMFs"), in which expert fund managers apply their knowledge of markets to select assets to buy for and sell from the funds they manage.

Managers of AMFs keep secret their day to day trading of fund assets and the identities and quantities of the underlying assets (portfolios) of the funds they manage. Fund secrecy prevents others from "free riding"—benefiting from managers' expert knowledge without investing in their funds and without paying fund management fees. Secrecy also prevents "front running"—observing fund trading trends to benefit from increasing or decreasing stock prices resulting from the fund's acquiring or selling off shares of the stock. While periodic reporting of fund assets is required, the reporting periods are long enough (e.g., quarterly or semi-annually with a 45 day lag) to prevent information about the AMF holdings to be sufficiently current to enable free riding or front running.

Current market regulations do not allow intra-day market trading of AMFs. Instead, investor orders to buy or sell AMFs received during the day are processed after market close, with the price based on the net asset value ("NAV") of the fund. The NAV is conventionally calculated for the current trading day after market close based on the assets held in the fund at the close of the previous trading day and the value of those assets at the close of the current trading day. One difficulty with implementing a system for intra-day market trading of AMFs is that investors have insufficient information on which to base negotiated trading prices because they currently have no way of knowing either the specific assets in the AMF portfolio or their NAV.

Another difficulty with implementing a system for intra-day market trading of AMFs is that many market participants, and especially market specialists and market makers, who match buy orders with sell orders or buy and sell stocks themselves to keep markets orderly and liquid, must be able to hedge their trading risks. Throughout this application, market makers, market specialists, and any other market liquidity providers will be referred to as "liquidity providers." When liquidity providers receive more orders to sell a stock than to buy it, they may buy the stock themselves and wait for more buy orders for that stock. Meanwhile, they risk the possibility that the value of the stock they hold will fall while they are holding it. They may hedge against this risk by making some trade that offsets the risk. But if the orders were to involve AMFs, then the liquidity providers would lack knowledge of the underlying assets, and thus would lack sufficient information to be able to effectively hedge this risk. Their inability to effectively hedge would result in an unacceptably wide spread between bid and offer prices, which in turn would inhibit trading.

In 1993, the American Stock Exchange ("AMEX") introduced a class of funds that can be traded intra-day on public stock exchanges. These exchange-traded funds ("ETFs") are generally based on some recognized index and thus have publicly known and published holdings. Like AMFs, ETFs provided investors with convenient diversification, but they also provided convenient trading platforms in secondary markets such as stock exchanges. For example, ETF index funds consist mostly of shares of the stocks in the same proportion as those used to calculate stock market indices, and have market values that vary with those indices. Well-known exchange traded funds include the SPDR Trust ("SPY"), which tracks the S&P 500 Index, the Nasdaq 100 Trust ("QQQ"), which tracks the Nasdaq 100 Index, and the Diamonds Trust ("DIA"), which tracks the Dow Jones Industrial Average. Information sufficient to accurately estimate the compositions of these funds is publicly available on a day-to-day and intra-day basis, and estimates of the intra-day values of these funds can be computed during intra-day trading based on the intra-day values of their underlying assets at the start of the trading day. Market liquidity providers can hedge in situations in which there is a short term oversupply or over-demand of these funds because they know exactly which stocks comprise the funds. Current ETFs may be considered "passively managed" funds, because the fund managers do not use forecasting expertise to decide investment strategies, but rather simply maintain portfolios that reflect the compositions of the indices they are intended to track.

The AMEX obtained exemptions from certain securities regulations that allow its ETFs to function successfully while maintaining fair investment practices. One such exemption allows intra-day trading of ETFs by allowing trading at negotiated prices rather than the NAV of the underlying assets. Another exemption encourages trading of ETFs on secondary markets by allowing the fund company to issue and redeem ETF shares only in large aggregations called "creation units" of many thousands of ETF shares.

Creation units are purchased with "portfolio deposits" equal in value to the NAV of the ETF shares in the creation units. The compositions of portfolio deposits are published by ETF fund managers daily, and usually reflect the proportionate assets in the ETF portfolio. Investors must redeem ETF shares only in creation unit aggregations. The fund presents an investor redeeming a creation unit with a "redemption basket." The compositions of redemption baskets are also published by ETF managers daily, and also usually reflect the proportionate assets in the ETF portfolio. After a creation unit is purchased, the ETF shares can be traded individually on secondary markets, but individual ETF shares may not be redeemed with the fund company itself.

The securities regulations exemptions enjoyed by ETFs are justified because the transparent, open-ended creation/redemption structure allows negotiated prices of ETF shares on secondary markets to be kept substantially in line with the intra-day value of the underlying assets by arbitrage. If the price of ETF shares is significantly less than the value of the underlying securities, then arbitragers can purchase enough ETF shares to assemble a creation unit, redeem the creation unit with the fund for a redemption basket, and simultaneously sell the underlying securities in the redemption basket (or futures contracts representing the underlying securities), thus realizing a profit. This additional demand for ETF shares tends to bring their price up to the intra-day value. If the price of ETF shares is significantly greater than the intra-day value, on the other hand, then arbitragers can purchase the underlying securities to assemble a portfolio deposit and purchase a creation unit, and simultaneously sell the ETF shares on the secondary markets at a profit. The additional supply of ETF shares tends to bring their price down to the intra-day value. The substantial equivalence of ETF share prices in transactions with the fund company and on secondary markets resulting from arbitrage ensures that larger institutional investors are not favored over smaller individual investors.

Investors have embraced many ETFs for their convenient diversification in a single investment instrument and the trading flexibility they allow. Because of the success of current ETFs, there has been significant interest in allowing more management freedom than is currently possible in ETFs. But part of the value of any actively managed fund is in portfolio secrecy, which obstructs pricing evaluation (because the intra-day value is unknown), hedging (because the portfolio is unknown), and arbitrage (because to preserve portfolio secrecy, creation/redemption baskets may not be representative of the fund holdings). There is, therefore, a need for systems and methods to allow intra-day trading of AMFs by providing a creation/redemption structure that promotes arbitrage and providing information equivalent to the intra-day values and portfolios of AMFs without disclosure of the specific assets of the funds.

SUMMARY

The invention includes methods of using computer means to select a second set of securities that substantially tracks the returns of a first set of securities over the course of a trading day, wherein the second set of securities serves as a proxy for the first set of securities, and market participants use the second set of securities to price or hedge a position taken in the first set of securities without knowing the composition of the first set of securities. Any mathematical method may be used to select the second set of securities including, for example, economic or statistical risk factor models or Monte Carlo methods. The invention further includes systems for performing these methods.

One embodiment of the invention includes a method for permitting efficient trading of shares of a fund without revealing the fund assets, comprising: determining a set of risk factors from a risk factor model, receiving or calculating a set of fund sensitivity coefficients and storing the set of fund sensitivity coefficients on computer readable media, wherein each fund sensitivity coefficient specifies the exposure of the fund to one of the risk factors, and using computer means to create a proxy portfolio having substantially the same sensitivity coefficients as the fund. Another embodiment further includes the steps of calculating an estimated value for the fund based on the value of the proxy portfolio, wherein the step of calculating the estimated value is repeated periodically throughout a trading period, and publishing the estimated value periodically throughout the trading period. Another embodiment additionally or alternatively includes the step of creating a hedging portfolio, wherein the hedging portfolio has substantially the same sensitivity coefficients as the fund.

The risk factor model may be an economic risk factor model, and the risk factors may include unexpected changes in default premiums, unexpected interest rate changes, unexpected changes in inflation rates, unexpected changes in long term economic growth, market risk as measured by a benchmark index, unexpected changes in debt term structure, risk premium, firm size effects, leverage, and/or book-to-market equity.

Alternatively, the risk factor model may be a statistical risk factor model, such as principal components analysis. In this embodiment, the method may further comprise the step of selecting securities for a proxy universe, wherein the step of creating a proxy portfolio involves calculating weights of securities in the proxy universe. The risk factors may be calculated by orthogonalizing a correlation matrix of returns functions of the securities in the proxy universe. The step of measuring the exposure of the fund to the set of risk factors may include a linear least squares regression.

In one embodiment, the method may further comprise the steps of sorting the securities in the proxy universe into a plurality of groups, creating a correlation matrix of returns functions of the securities in each group of securities, thereby creating a correlation matrix for each group, orthogonalizing the correlation matrix for each group to produce a first set of eigenvalues and corresponding eigenvectors for each group, arranging the first set of eigenvalues for each group in descending order, eliminating a number of the smallest eigenvalues from the first set of eigenvalues and their corresponding eigenvectors from each group according to predetermined elimination criteria to produce a reduced set of principal components for each group, creating a correlation matrix between all of the principal components in the reduced set of principal components for each group, orthogonalizing the correlation matrix between all of the principal components in the reduced set of principal components for each group to produce a second set of eigenvalues and corresponding eigenvectors for all reduced groups, and eliminating a number of the smallest eigenvalues and their corresponding eigenvectors from the second set of eigenvalues and corresponding eigenvectors to produce a set of risk factors.

An embodiment of the invention includes a method for creating a proxy portfolio for a fund without revealing the fund assets, comprising the steps of: measuring an exposure of the fund to a set of risk factors to produce a set of fund sensitivity coefficients, wherein the risk factors comprise a historical time series of price data for a set of securities and each fund sensitivity coefficient indicates the exposure of the fund to one of the risk factors, storing the fund sensitivity coefficients on computer readable media; and using computer means to create a proxy portfolio from securities selected from a proxy universe of securities, wherein the proxy portfolio has substantially the same sensitivity coefficients as the fund.

An embodiment of the invention includes a method for creating a hedging portfolio for a fund without revealing the fund assets, comprising the steps of measuring an exposure of the fund to a set of risk factors to produce a set of fund sensitivity coefficients, wherein the risk factors comprise a historical time series of price data for a set of securities and each fund sensitivity coefficient indicates the exposure of the fund to one of the risk factors; storing the fund sensitivity coefficients on computer readable media; using computer means to create a proxy portfolio from securities selected from a proxy universe of securities, wherein the proxy portfolio has substantially the same sensitivity coefficients as the fund; and using computer means to create a hedging portfolio based on the proxy portfolio.

An embodiment of the invention includes a method for creating a reduced risk hedging portfolio for a fund without revealing the fund assets, comprising the steps of measuring an exposure of the fund to a plurality of risk factors to produce a set of fund sensitivity coefficients, wherein the risk factors comprise a historical time series of price data for a set of securities in the hedging portfolio; storing the fund sensitivity coefficients on computer readable media; using computer means to determine the exposure of each of the securities in a hedging universe of securities to the risk factors; and using computer means programmed with risk minimizer software to produce a reduced risk hedging portfolio.

In other embodiments, the invention includes systems for performing the methods described above, including computer means for performing any or all of the steps of the methods described above. The systems of the invention may include a computer programmed with a graphical user interface, including a graphical dial, slide bar, or other graphical indicator for adjusting user inputs, wherein the user inputs are selected from the group consisting of the size of aggregation buckets, database minimum data density requirements, banding time, the number of returns used to build the model, the type of weighting, the percent variation used for eigenvalue and factor culling, and the total number of factors to be used in the model. In still other embodiments, the invention includes data storage devices storing software instructions to cause a computer to perform the methods described above.

DESCRIPTIONS OF THE FIGURES

Figure 5:
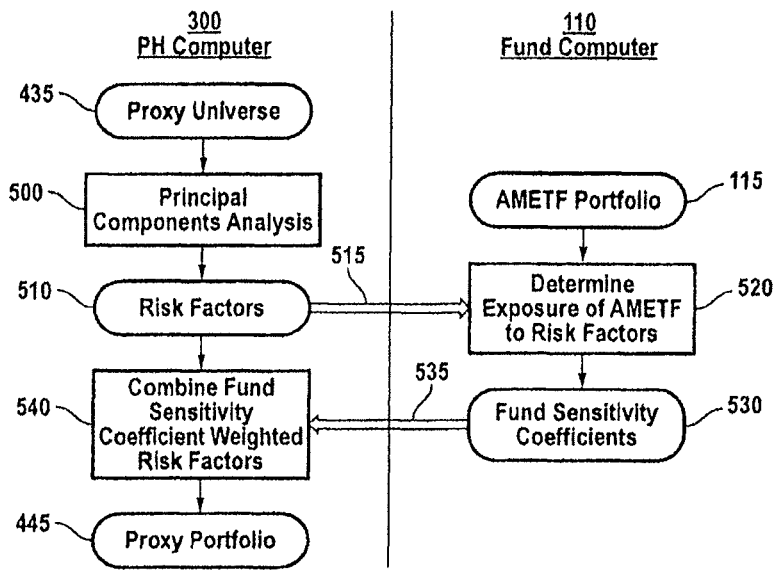
FIG. 5 is an embodiment of the process shown in FIG. 3, where the factor model is a statistical factor model.
Figure 5A:
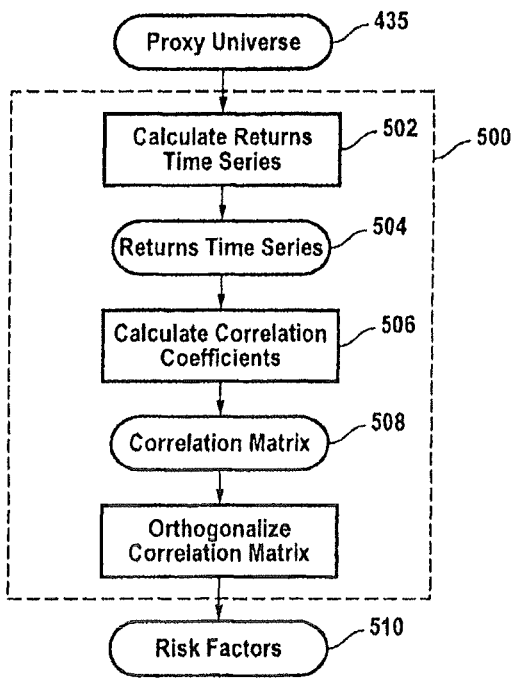

FIG. 5A outlines the steps of the basic PCA process for finding risk factors for use in building a statistical factor model.

Figure 5B:
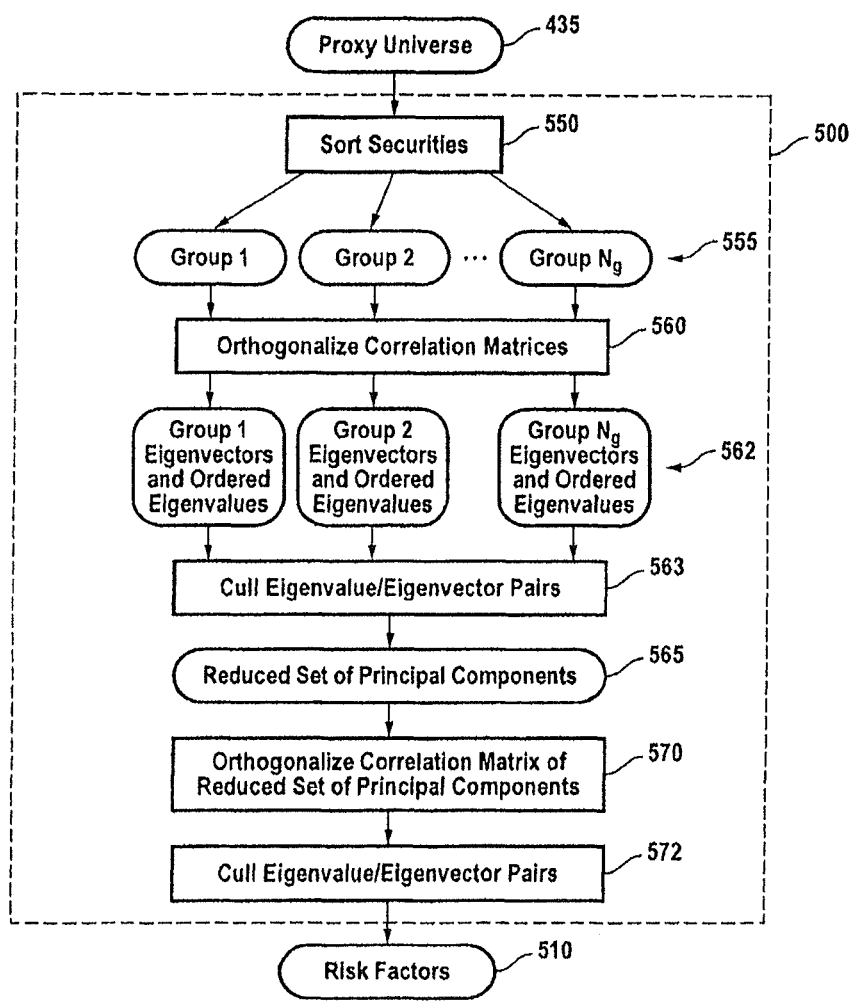

FIG. 5B outlines the steps of a two-step PCA process for finding risk factors for use in building a statistical factor model.

Figure 6:
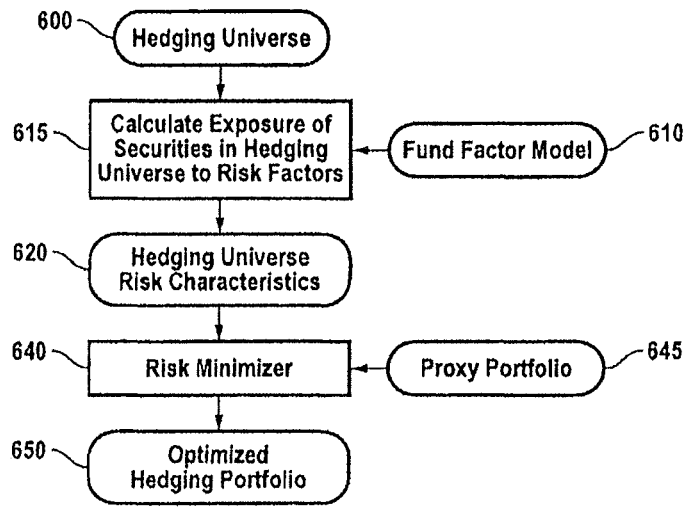

FIG. 6 is an embodiment of a process for constructing an optimized hedging portfolio with minimum deviation from a proxy portfolio.

Figure 7:
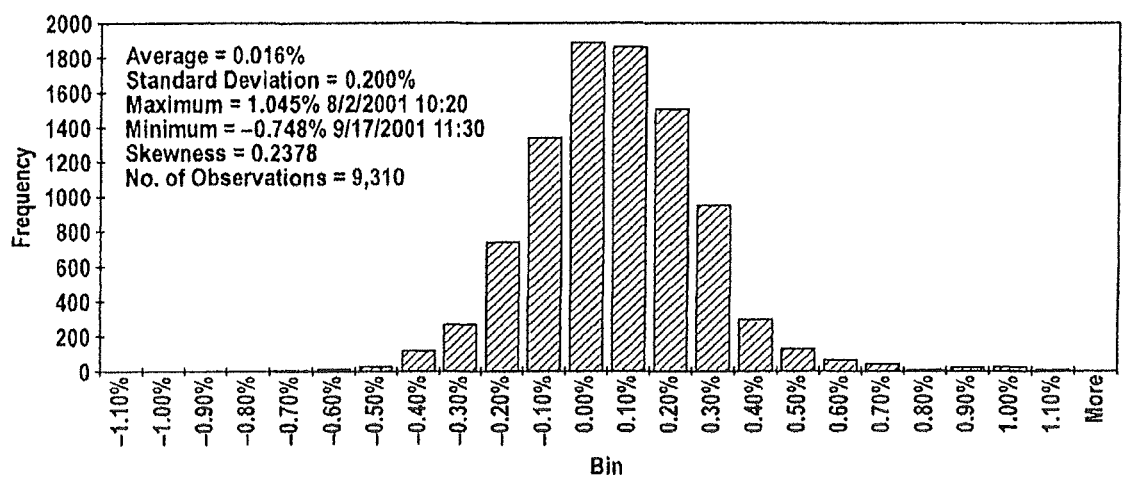

FIG. 7 is a histogram of the percent differences in intra-day values between a proxy portfolio model created according to the methods of the invention and the AMETF that the proxy portfolio models for each reporting period (every 10 minutes) for each trading day in an entire year.

Figure 8:
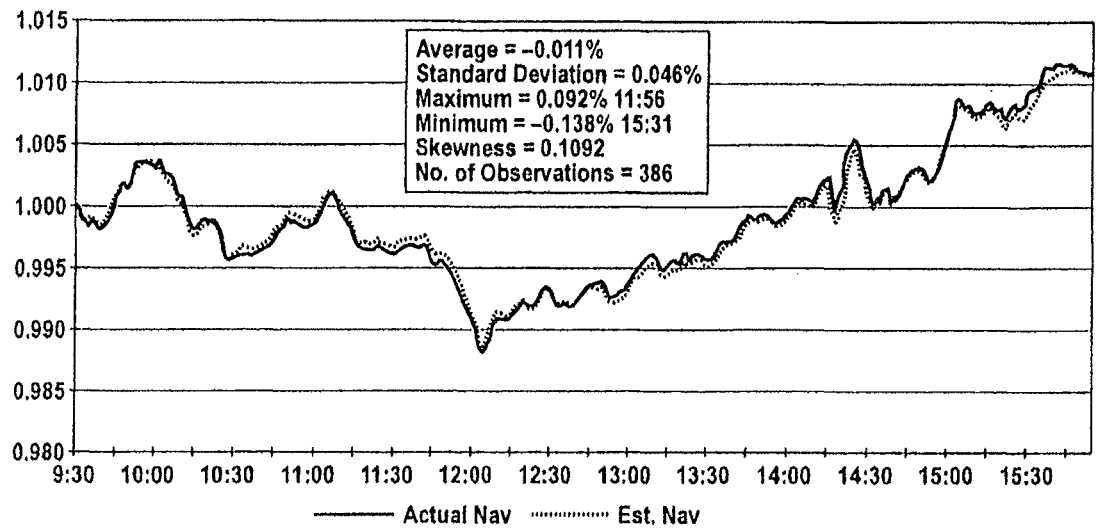

FIG. 8 is a graph illustrating that a proxy portfolio constructed according to the methods of the invention accurately tracks the AMETF portfolio it models throughout a trading day.

Figure 9:
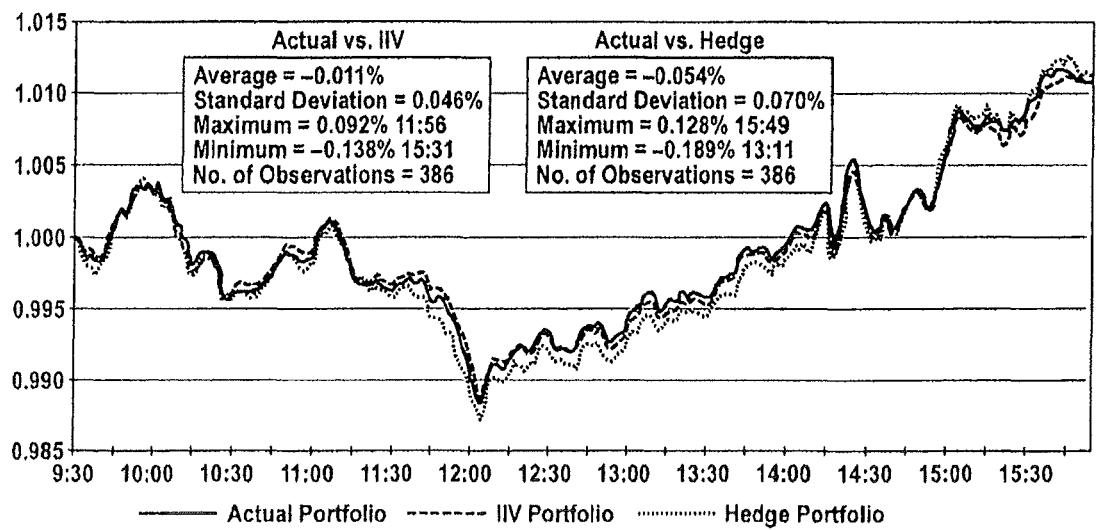

FIG. 9 is a graph illustrating that an optimized hedging portfolio constructed according to the methods of the invention accurately tracks the AMETF portfolio.

DETAILED DESCRIPTION

The invention provides systems and methods that allow trading of any fund while maintaining secrecy of the specific assets of the fund. While much of the following description is in terms of AMETFs, the funds traded using the systems and methods of the invention can include (and the term "fund" as used herein includes at least the following): any type of investment instrument including, for example, shares of mutual funds, unit investment trusts (UITs), closed-end funds, grantor trusts, hedge funds, any investment company, or any other type of collective investment. Furthermore, while the examples provided herein demonstrate intraday trading of fund shares on a stock exchange without disclosure of fund assets, the systems and methods of the invention are equally applicable to trading of secret-asset fund shares at any time on any venue, market, or exchange, for example, after-hours trading on a U.S. or foreign exchange, or on an electronic trading network (ECN) or over-the-counter, third market, or other off-exchange trading venue.

The invention provides structures for creating and redeeming AMETF shares that allow arbitrage, methods for publishing an intra-day asset value that can be used by investors to base negotiated prices, and portfolios that can be used by market liquidity providers and others to hedge risks from trading AMETF shares. The information provided by the invention need not include specific information about the specific fund holdings or information sufficient even to determine approximate fund holdings. Instead, the information should be sufficient to create portfolios that mimic the behavior of AMETFs accurately enough to base negotiated prices of the AMETFs on and to hedge AMETF investment risks.

In accordance with the invention, AMETFs may be organized as investment companies (or fund companies), which are companies that issue securities and whose primary business is investment. In a preferred embodiment, AMETFs may be open-ended, and thus issue shares that may be redeemed by the investment company for their NAV. While AMFs are currently not traded on secondary markets, the structures, systems, and methods described below can allow exchange trading. While most ETFs are open-end management investment companies, some ETFs are organized as UITs, and a similar organizational structure may be used for AMETFs. In an alternative embodiment, AMETFs may be organized as closed-end companies, which issue shares that are not redeemable by the fund company at all times, but rather are traded primarily on secondary markets.

There are a number of ways in which the distribution structure of AMETF shares may be organized. One way is to allow cash transactions with the fund company, thus allowing the purchase and redemption of AMETF shares for cash, as most AMFs are organized. Preferably, cash transactions with the fund company are executed at the end of the trading day based on the NAV of the fund at market close, as with most AMFs. Alternatively, cash transactions may be made with the fund company during the trading day. The benefits of cash transactions are that they are simple to implement and require no disclosure of the fund portfolio. However, other alternatives are preferable for many reasons. One reason is the cash exposure risk: when fund companies sell AMETF shares for cash, the fund gains cash at the expense of a proportionate value of the fund portfolio, which negatively affects the performance of the fund if the value of the securities in the fund portfolio increases more than the value of an equivalent amount of cash. The fund manager will thus want to convert all the cash into the securities in the fund portfolio, which results in transaction costs including brokerage commissions and bid/offer spread costs. Furthermore, cash transactions can cause potentially adverse tax consequences on any gains realized.

Another way in which AMETF shares may be distributed and redeemed involves the fund manager defining and publishing creation and redemption baskets each day, and traders purchase and redeem shares of the AMETF by assembling creation baskets to purchase shares and receiving redemption baskets upon redemption of shares. This structure resembles that of ETFs, with an important difference. With ETFs, the fund portfolio is essentially public knowledge, which allows the creation and redemption baskets to reflect the assets underlying the fund itself. But AMETF portfolios are preferably kept secret, so the creation and redemption baskets preferably do not reflect the fund's underlying assets because publication of the basket portfolios would reveal the fund portfolios. Thus in one creation/redemption basket embodiment, AMETF fund managers may be given flexibility to select the securities that comprise creation and redemption baskets. This flexibility would allow fund managers to alter the fund composition through creation and redemption according to investment strategies while maintaining fund secrecy by selecting baskets that need not reflect the actual fund portfolio. This structure provides the benefits of little or no cash exposure risk, minimized transaction costs for the fund, tax efficiencies, and limited disclosure of information relating to fund composition.

A related creation/redemption structure can involve the specification of a "factor basket," which is a basket not of financial instruments, but rather of information regarding the exposure of the AMETF portfolio to certain pre-specified or unspecified factors. Several examples are provided below of how to select factors and calculate the exposure of AMETF portfolios to the factors. In a factor basket embodiment, any group of securities that has substantially the same exposure to the factors in the factor creation basket (and the same NAV as a creation unit) can be used to buy fund shares, or any group of securities with substantially the same exposure to the factors in a redemption basket (with the same NAV as a creation unit) can be received in exchange for fund shares. However, it is anticipated that the arbitrageurs and institutional investors who would be the primary entities dealing directly with the fund company would tend to put disfavored stocks (e.g., not actively traded) in the creation basket, if given the choice. The fund would then own the disfavored stocks, which may be difficult to trade if they are illiquid. It is likewise anticipated that the fund company would tend to put disfavored stocks in redemption baskets. These tendencies may inhibit arbitrage. One way to overcome this would be to require traders and the fund company to select from a predetermined universe of instruments in order to generate creation and redemption baskets having substantially the same exposures to the designated factors as the AMETF portfolio. Such a structure provides the benefits of minimizing cash exposure risk, tax efficiencies, and limited disclosure of information relating to fund composition. However, there would be some transaction costs associated with converting the securities received in creation baskets into securities to be held in the AMETF.

The preferred creation/redemption structure uses benchmark index ETFs in creation and redemption baskets. For example, creation and redemption baskets for an AMETF may comprise SPDRs, shares in an ETF comprising essentially the same shares of stocks of the companies in essentially the same proportions underlying the S&P 500 index, even though the AMETF portfolio itself may contain a different set of stocks and/or a different set of proportions. In another embodiment, the creation and redemption baskets may contain securities underlying one or more benchmark indices in the same or different proportions than in those indices. In yet another embodiment, the creation and redemption baskets may contain securities underlying one or more benchmark indices in proportions specified by the fund manager. When the creation and redemption baskets comprise benchmark index ETFs, this minimizes cash exposure risk, limits the disclosure of information relating to the AMETF portfolio, and eliminates the benchmark risk (i.e., the risk that the value of the assets in the creation basket will underperform the fund's index benchmark).

In one embodiment, the invention includes methods for providing an intra-day value proxy for an AMETF without disclosure of the fund's underlying assets. Market rules and securities regulations require the values of ETFs to be published frequently throughout the day, for example, every 15 seconds. Similarly frequent intra-day value information will need to be provided for AMETFs, with a concurrent need to keep the fund portfolio secret.

Figure 1:
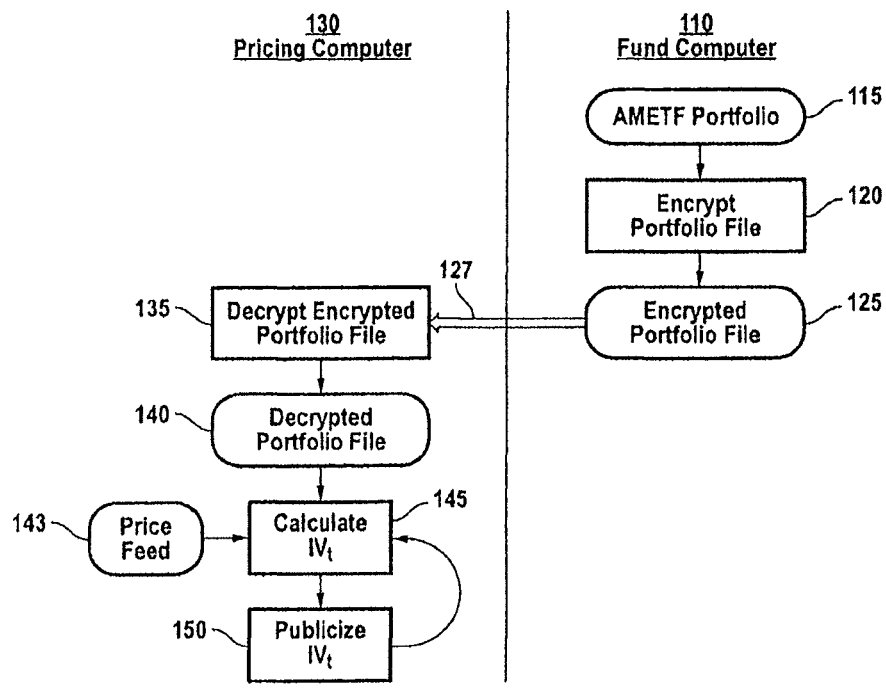
FIG. 1 is a process of the invention for providing an intra-day value of an AMETF involving encryption, decryption, and an intra-day value calculation based on the AMETF.

FIG. 1 shows a method that can provide updated intra-day value information for an AMETF throughout the day without public disclosure of the underlying assets. A fund computer 110 stores a portfolio file 115, that contains the identities and quantities of all of the fund holdings. The fund computer 110 preferably includes standard protections against unauthorized access to the portfolio file (for example, password protection and a firewall). The fund computer may be operated by an agent of the fund, e.g., the fund manager, administrator, or custodian. In step 120, the portfolio file may be encrypted using any known encryption techniques and algorithms to generate an encrypted portfolio file 125.

In step 127, the encrypted portfolio file 125 is sent to another computer 130, referred to here as a pricing computer. The pricing computer 130 may be operated, for example, by an exchange that lists the AMETF. Alternatively, the pricing computer 130 may be operated by a third party that transmits intra-day value information to an exchange, or the pricing computer may be operated by an agent of the fund itself (see, for example, the embodiment of FIG. 2). In step 135, the pricing computer 130 decrypts the encrypted portfolio file to produce a decrypted portfolio file 140 indicating the fund holdings.

The pricing computer 130 receives a price feed 143 periodically (e.g., every 15 seconds) throughout the trading day that contains current pricing information at each time t throughout the day. The price feed 143 provides pricing information (e.g., bid and ask prices) for a set of securities that preferably includes each security in the fund portfolio. In step 145, the pricing computer computes the value of the decrypted portfolio 140 throughout the trading day for each time t by applying some measure of the prices of the securities in the decrypted portfolio 140 as received from the quote server 130 at each time t. In step 150, the intra-day value calculated for each time t ("$IV_t$") is published throughout the trading day, allowing investors to form a basis for negotiating trading prices of the AMETF shares.

In a preferred embodiment, the portfolio file 115 that is encrypted in step 120 and decrypted in step 135 reflects the fund holdings of the AMETF as of the close of a trading day (including any trading on that day), and the computing 140 and publicizing 150 steps performed by the pricing computer 130 are performed throughout the next trading day. In this embodiment, the pricing computer can use the information from the portfolio file reflecting the holdings of the fund as of the close of the previous trading day (including any trading on that day) to estimate the intra-day value of the current fund holdings on the current trading day. The portfolio used by the pricing computer to calculate the intra-day value will differ from the actual current AMETF portfolio to the extent that the fund manager executes trades that change the composition of the fund during the current trading day. The intra-day value calculations subsequently performed by the pricing computer thus result in an intra-day value proxy, because they may be based on a portfolio that does not exactly mirror the fund portfolio. The intra-day value proxy provides sufficient information on which to base the price of AMETF shares, however, because fund managers do not typically make trades that change fund composition drastically enough to change fund performance significantly over the course of a single trading day. Moreover, the NAV calculated at the end of the trading day is based on the previous day's portfolio.

In an alternative embodiment, the fund computer 110 can update the portfolio file 115 each time a trade is made throughout the trading day that changes the composition of the AMETF. The updated portfolio file may be encrypted 120, and sent 127 to the pricing computer 130, which decrypts the file 135, and uses the updated information in the decrypted portfolio file 140 reflecting the current fund holdings to calculate the intra-day value 145. This embodiment would eliminate any difference between the actual intra-day value and the intra-day value calculated and published by the PH computer, thus providing the same quantity of information as provided in an embodiments shown in FIG. 2.

Figure 2:
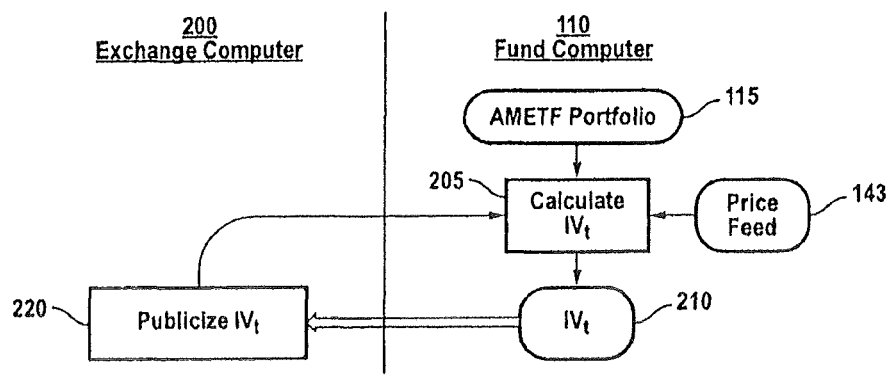
FIG. 2 is a process of the invention for providing an intra-day value of an AMETF.

The method shown in FIG. 2 can likewise provide the actual current intra-day value of an AMETF. A portfolio file 115 stored on a fund computer 110 can be kept updated throughout the trading day to reflect all trades that affect the composition of the AMETF portfolio. The fund computer 110 receives a price feed 143 containing current price information on a set of securities that preferably includes all of the securities held in the AMETF. The fund computer calculates the intra-day value of the fund portfolio 115 for each time t (e.g., every 15 seconds). The calculated $IV_t$ is sent to an exchange computer 200, which may be any computer capable of interfacing with any means for publishing the $IV_t$, such as a stock exchange. In step 220, the exchange computer 200 publishes the $IV_t$. Alternatively, the fund computer 110 can perform the intra-day value calculation 205 based on a portfolio file 115 that was updated on the previous trading day, but not throughout the current trading day, to produce an intra-day value proxy.

The methods shown in FIGS. 1 and 2 provide measures of intra-day values throughout the trading day without public disclosure of the underlying portfolio. But some fund managers may refuse to participate in trading systems implementing these methods because they may fear that the continuously updated intra-day values or intra-day value proxies can provide sufficient information for free riders to determine at least the major fund holdings and front runners to determine fund trading trends. (For example, if the share price of a major holding has a dramatic price move that will be reflected in the reported fund value, which will make the same move). Furthermore, while the intra-day values published by these methods provide a basis for trading on secondary markets at negotiated prices, they do not provide additional portfolio information to market liquidity providers (unless the fund manager is willing to provide it), making hedging difficult. Thus, the preferred methods of the invention described below calculate intra-day value proxies based not on the fund portfolio from the recent past, but rather on a generally different portfolio, and these methods can also serve as the basis for providing a hedging portfolio.

Figure 3:
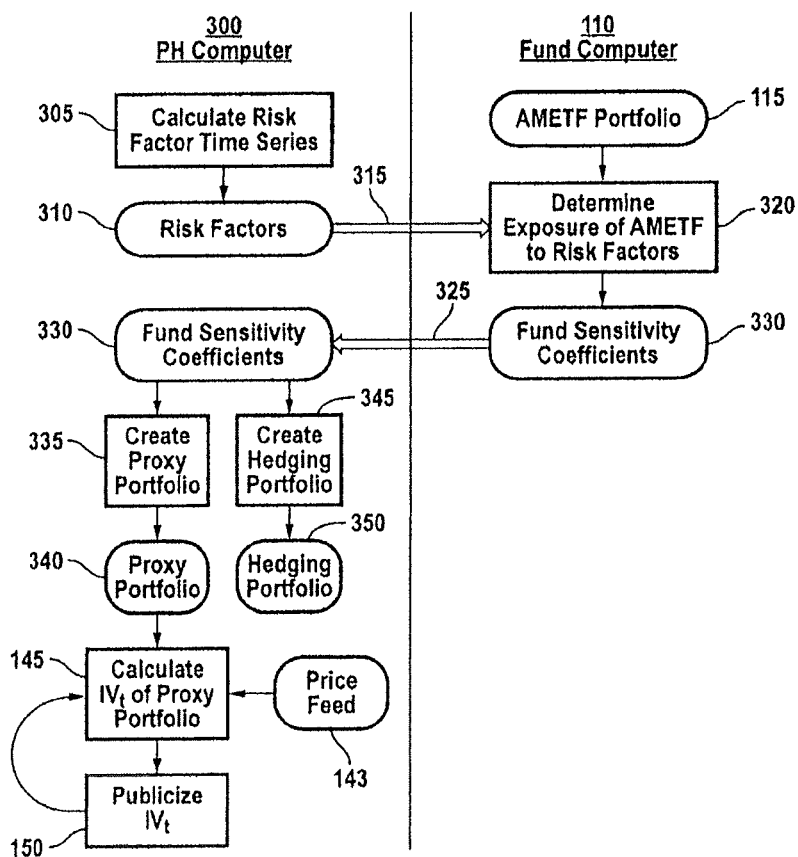
FIG. 3 is a process of the invention for providing an intra-day value proxy and a hedging portfolio for use in trading an AMETF based on a factor model of the AMETF that need not involve disclosure of the assets underlying the AMETF.

The invention provides systems and methods for constructing a proxy portfolio that may be used to calculate an intra-day value proxy for an AMETF, and that may also be used to construct a hedging portfolio for hedging against trading risks associated with trading in AMETFs with secret portfolios. These methods involve construction of factor models for AMETFs to construct portfolios that can track the intra-day values of the AMETFs and can provide hedging portfolios whose intra-day values track the intra-day values of their AMETFs. FIG. 3 shows a generalized embodiment of these methods of the invention.

Figure 4:
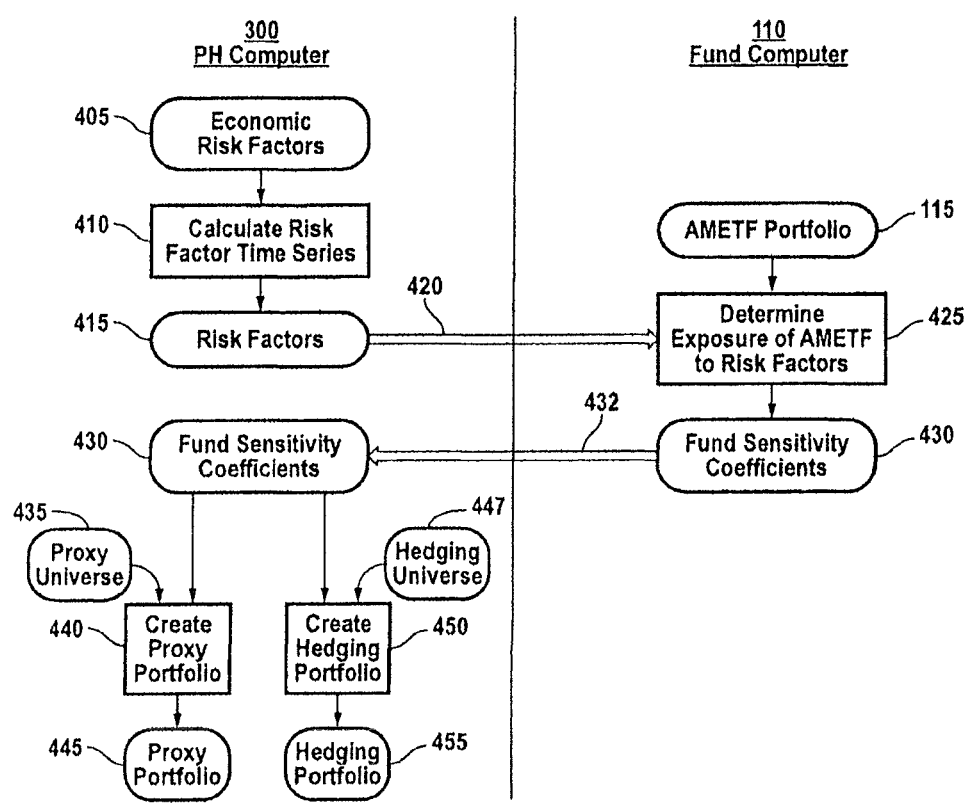
FIG. 4 is an embodiment of the process shown in FIG. 3, where the factor model is an economic factor model.

The method depicted in FIG. 3 may be performed on a system involving a fund computer 110 and a pricing and hedging computer ("PH computer") 300. The PH computer may be operated by an exchange, a fund company, or a third party. In step 305, the PH computer calculates a set of risk factors $\{R_i\}$ 310, each of which comprises a historical time series of data that reflects a particular risk. Specific embodiments of two types of risk factor calculations are shown in FIGS. 4 and 5, using an economic model and a statistical model, respectively. The risk factors 310 are sent to the fund computer 110 in step 315. This sending step and any other step in which data is transferred from one computer to another may further involve encryption of the sent data and decryption of the encrypted data, as described above with reference to FIG. 1.

In step 320, the fund computer 110 determines the exposure of the AMETF to the risk factors, to produce a set of fund sensitivity coefficients $\{\hat{\beta}_i\}$ 330. Each fund sensitivity coefficient $\hat{\beta}_i$, measures the exposure of the fund to risk factor $R_i$, that is, how much the value of the fund varies with the risk factor. The step of determining the exposure of the AMETF to risk factors is further detailed below. In step 325, the fund computer sends the fund sensitivity coefficients 330 to the PH computer 300. The PH computer can then create a proxy portfolio 335 that has substantially the same exposure to the same set of risk factors, and hence has substantially the same set of sensitivity coefficients as the fund (or close to it), but with a generally different set of securities in different proportions than those in the actual AMETF portfolio.

In steps 145 and 150, the PH computer can use the proxy portfolio 340 in combination with pricing data for the securities in the proxy portfolio from a price feed that is updated periodically (at each time t, for example, every 15 seconds) throughout the trading day to calculate an $IV_t$ in step 145, that is published in step 150. The process of calculation of the $IV_t$ and publishing the $IV_t$ may be repeated for each updated pricing data received from the price feed throughout the trading day.

The calculated 145 and published 150 IVt is a proxy for the actual AMETF intra-day value. In this case, however, rather than being based on the fund asset holdings of the AMETF from the previous trading day (as was the case in the embodiment described with reference to FIG. 1), the intra-day value proxy is based on a generally completely different set of holdings. This method of calculating the intra-day value based on a proxy portfolio has the benefit of providing an intra-day value that tracks the actual AMETF intra-day value during the day to within an acceptably small difference because both the proxy portfolio and the actual AMETF portfolio are exposed to the same risk factors, and thus behave very similarly throughout a single trading day. However, it also provides an additional benefit for fund companies, because less information about the AMETF holdings is provided. It is believed to be impossible to determine an AMETF's holdings from even the fund risk factor exposure coefficients, let alone from the published intra-day value proxy generated from the proxy portfolio in this method.

The method of FIG. 3 also provides a step 345 for creating a hedging portfolio 350. Details of how the hedging portfolio may be created are set forth in the descriptions accompanying FIGS. 4 and 5. While in the embodiments shown in FIGS. 3-5 the hedging portfolio is created directly from the fund sensitivity coefficients, alternate embodiments are also possible. For example, a hedging portfolio may be created from a proxy portfolio, for example by retaining only the most heavily weighted stocks in the proxy portfolio or performing a risk minimization on the proxy portfolio.

The hedging portfolio can be created from a pre-selected set of preferred hedging securities selected, for example, on the basis of liquidity. It is important for liquidity providers to hedge their trading risks with securities that they can easily sell, hence the hedging portfolio may consist of a different set of securities (preferably with more liquidity) than the proxy portfolio. Like the proxy portfolio, however, the hedging portfolio also generally contains a different set of securities in different proportions than the AMETF itself. In one embodiment, the hedging portfolio can be used instead of the proxy portfolio to calculate an intra-day value proxy (thus eliminating the need to calculate the proxy portfolio at all). However, it is anticipated that the proxy portfolio would be better suited to the purpose of intra-day value proxy calculation because there are preferably fewer limits on the securities that can comprise the proxy portfolio, and hence the intra-day value computed using the proxy portfolio would be expected to more accurately track the actual intra-day value of the AMETF than an intra-day value computed using the hedging portfolio.

FIG. 4 is a specific embodiment of the method depicted generally in FIG. 3, and involves an economic factor model. The method of FIG. 4 involves selection of a group of predetermined economic risk factors 405. Analysis of investment risk through economic risk factors is a well studied art, and has produced many different successful pricing models. For example, in the Arbitrage Pricing Theory (APT) economic model, investments are typically analyzed in terms of five basic risk factors: (1) unexpected changes in default premiums, (2) unexpected interest rate changes, (3) unexpected changes in inflation rates, (4) unexpected changes in long term economic growth, and (5) market risk as measured by a benchmark index. See Berry et al., "Sorting Out Risks Using Known APT Factors," Financial Analysts Journal, March-April 1988, pp. 29-41 (incorporated entirely herein by reference). Other APT risk factors may include unexpected changes in debt term structure, risk premium, and firm-specific risks such as firm size effects, leverage, and book-to-market equity. See, e.g., Fama et al., "Common risk factors in the returns on stocks and bonds," J. Financial Economics 33:3-56 (1993); Chan et al., "An Exploratory Investigation of the Firm Size Effect," J. Financial Economics 14:451-471 (1985); Connor et al., "A Test for the Number of Factors in an Approximate Factor Model," J. Finance XLVIII(4):1263-91 (1993); Rosenberg, "Extra-Market Components of Covariance in Security Returns," J. Financial and Quantitative Analysis 9:263 (1974); Beckers et al., "The Relative Importance of Common Factors Across the European Equity Markets," J. Banking and Finance 16:75 (1992); Kale et al., "Industry Factors Versus Other Factors in Risk Prediction," working paper, University of California, Berkeley (1991); and Lehman et al., "The Empirical Foundation of the Arbitrage Pricing Theory," J. Financial Economics 21:213 (1988). (All cited articles incorporated entirely herein by reference).

Economic risk factor models have been employed to allow investors to evaluate specific risks in their investments. In the present invention, however, an economic risk factor model may be employed to provide a model for an AMETF portfolio, which may be used to construct proxy and hedging portfolios. This embodiment allows the fund assets to remain confidential, yet provides models for the behavior of those assets that allow accurate estimation of their intra-day values and creation of acceptable portfolios for hedging trades of fund shares.

Any set of economic risk factors 405 may be selected to model the AMETF portfolio. Criteria useful for selecting the economic risk factors include measurability (i.e., the risk factors should be based on some measurable quantity, such as inflation rates, interest rates, market indicies, etc.), the availability of historical data on the risk factors, and the anticipated relevance of the risk factors to the types of securities expected to be held by the fund to be modeled. In step 410, risk factor time series are calculated from historical data. For example, risk factor time series may be based on daily, weekly, or monthly reports of default risks, interest rates, inflation rates, growth projections, and market risks over a period of time such as the previous year. Other risk factor time series may be based, for example, on more frequent recent reports of prices or returns of securities and combinations of securities that are sensitive to the selected risk factors. The time period used for constructing the historical risk factor time series is preferably recent enough to be relevant to current calculations, yet extends in time back far enough that an adequate number of reports are incorporated into the time series for robust regression analyses, which are described below.

The risk factor time series 415 of risk factor i is denoted $\{R_{i,t}\}$. For a model with five risk factors, for example, i ranges from 1 to 5. The index 't' denotes the historical times at which the risk factor was reported. For example, if the risk factor time series were to be constructed from historical data reported daily for the last 20 trading days, then t would range from 1 to 20.

In step 420, the PH computer sends the risk factor time series set 415 to the fund computer 110. In step 425, the fund computer 110 evaluates the exposure of the current AMETF portfolio 115 to the risk factors. This step measures how much each of the risk factors explain the intra-day value of the current AMETF portfolio during the time periods of the historical data recorded in the risk factor time series. The fund computer may access a database of historical pricing data for each of the assets in the AMETF portfolio, designated $P_{j,t}$, where $P_j$ represents the price of fund security j, and j ranges from 1 to $N_F$, the number of securities in the fund. As with the risk factor time series, the index t denotes the historical time at which the price was evaluated. Depending on the construction of the risk factors, the risk exposure calculation 425 may be based on a function of the pricing data for the AMETF portfolio rather than unmodified historical pricing data. Thus, instead of using pricing data itself, more relevant information may be some function of the pricing data $F_{j,t}$, for example, log price returns, $F_{j,t}=\ln(P_{j,t})-\ln(P_{j,t-1})$, or percentage returns, $F_{j,t}=(P_{j,t}-P_{j,t-1})$, or some other stationary function of the historical pricing data. Whatever function of the pricing data is selected, the same type of function should be used in subsequent calculations.

The risk exposure calculation 425 is a linear regression model that seeks to explain the past behavior of the AMETF portfolio 115 through the past behavior of the selected risk factors. While individual regressions over each security held in the portfolio is one approach, a faster approach uses a single regression for the AMETF as a whole. A time series of return data for the AMETF can be constructed by summing the returns for each of the securities currently in the fund: $F_t = \Sigma_j a_j F_{j,t}$, where $a_j$ is the current proportion of instrument j to the entire AMETF, and $\Sigma_j$ denotes a sum over the entire range of index j (here, from 1 to $N_F$, the number of securities in the AMETF portfolio). Sensitivity coefficient estimates $\hat{\beta}_i$ for the fund can be derived using a linear least squares regression fit of the following equation:

$$F_t = \Sigma_i \beta_i R_{i,t} + \varepsilon_t,$$

where $\varepsilon_t$ denotes the error term, the fund return time series $F_t$ and each of the risk factor time series $R_{i,t}$ are known, and the regression fit finds an optimal set of estimated sensitivity coefficients $\beta_i$. The regression minimizes the variance $$V(\beta) = \frac{1}{N-1} \sum_t \varepsilon_t^2$$

where N is the number of historical price data points, and is the maximum value of the index $\tau$. The minimization yields an optimal risk factor vector $\hat{\beta}$ with components $\hat{\beta}_i$. Each of the $\hat{\beta}_i$ estimates the exposure of the AMETF to risk factor $R_i$. Here and in all subsequently described regressions any other method of extracting the sensitivity coefficients may be used, but linear least squares regression is fast and has been found to perform well.

The fund computer sends the fund sensitivity coefficient estimates ($\hat{\beta}$) 430 to the PH computer in step 432, and the PH computer uses them to create proxy and hedging portfolios. In step 440, the PH computer uses the fund sensitivity coefficients to create a proxy portfolio to provide a proxy for the AMETF intra-day value. A database of securities that may be selected for inclusion in the proxy portfolio, the proxy universe 435, provides historical pricing data for each of the securities in the database. A great deal of variety is possible in the proxy universe, which can include any type of security. The proxy universe may contain a greater number of securities than the AMETF itself. If the fund and the risk factors are co-integrated, then price data may be used directly; otherwise it may be converted into some function of the pricing data such as the log price returns $U_{j,t}=\ln(P_{j,t})-\ln(P_{j,t-1})$ or the percentage returns $U_{j,t}=(P_{j,t}-P_{j,t-1})/(P_{j,t-1})$, or some other stationary function of the historical pricing data. To construct the proxy portfolio, a set of weighting coefficients should be determined, where each weight $w_j$ represents the relative weight of security j in the proxy portfolio. Such weighting could be long or short.

Step 440 can use linear regression to express each of the risk factors $R_{i,t}$ in terms of linear combinations of the securities in the proxy universe using the equation:

$$R_{i,t} = \Sigma_j w_{i,t} U_{j,t} + \varepsilon_{i,t}$$

where $\varepsilon_{i,t}$ is the error term, the returns $U_{j,t}$ are known, and the risk factor time series $R_{i,t}$ are known, leaving the weighting coefficients $w_{i,t}$ to be determined by regression. Individual regressions can be run for each risk factor $R_i$. The regressions minimize the variance equations $$V(w_i) = \frac{1}{N-1} \sum_t (\varepsilon_{i,t})^2$$

where N is the number of historical data points and $w_i$ is the vector of weighting coefficients that are adjusted during the optimization. The optimal weighting coefficients, once determined, provide sufficient information to construct the proxy portfolio 445. If the total amount of money invested in the fund to be modeled is M, and $P_j$ is the price of security $S_j$ in the proxy universe, then the number of shares of security $S_j$ in the proxy portfolio is given by $Mw_j/P_j$, where $w_j = \Sigma_i \hat{\beta}_i \hat{w}_{ij}$. Accordingly, the proxy portfolio is given by:

$$\text{Proxy Portfolio} = \sum_i \sum_j = \frac{M\hat{\beta}_i \hat{w}_{i,j} S_j}{P_j}$$

The proxy portfolio can be used as shown in FIG. 3, steps 145 and 150, to calculate and publish an intra-day value proxy for the AMETF throughout the day.

An identical procedure can be used to create the hedging portfolio in step 450. However, the securities selected for the hedging universe 447 may be limited by criteria on the securities that are not required for the proxy portfolio, which is never traded itself, but rather simply provides an intra-day value proxy. For example, the hedging universe 447 may be a subset of the proxy universe, where the subset includes actively traded stocks with acceptable risk profiles. In this embodiment, a linear regression is performed using the known risk factors and fund sensitivity coefficients, this time to find the weights of securities in the hedging universe 447 to construct the hedging portfolio 455. An alternative procedure for constructing hedging portfolios is described below with reference to the customized hedging portfolio method of FIG. 6, in which a risk minimizer constructs a hedging portfolio designed to track a proxy portfolio, and selects from instruments indicated by the liquidity provider who will use the hedging portfolio.

FIG. 5 is another specific embodiment of the method depicted generally in FIG. 3, and involves a statistical factor model. Rather than using predetermined economic factors, as in the embodiment shown in FIG. 4, the statistical factor model method involves an a priori calculation of model factors based on historical price data from a group of securities. The details of statistical factor models can be found in a number of references. The principal components analysis statistical factor model was first described in Pearson, "On Lines and Planes of Closest Fit to Systems of Points in Space," Philosophical Magazine, 6(2): 559 (1901). Recent applications of principal components analysis can be found in Fleurie, "Common Principal Components and Related Multivariate Models" (Wileys, 1988) and Alexander, "Market Models: A Guide to Financial Data Analysis" (Wileys, 2001). Other relevant references include Feeney, George, and Donald Hester, "Stock Market Indexes: a Principal Component Analysis, Cowles Foundation Monograph" 19, 110-138 (1967); Lessard, Donald R., "International Portfolio Diversification: A Multivariate Analysis for a Group of Latin Countries," Journal of Finance 28/3, 619-633 (1973); Huberman, Gur, Shmuel Kandel and Robert F. Stambaugh, "Mimicking Portfolios and Exact Arbitrage Pricing," Journal of Finance 42, 1-9 (1987); Connor, Gregory, and Robert A. Korajczyk, "Risk and Return in an Equilibrium APT-Application of a New Testing Methodology," Journal of Financial Economics 21, 255-289 (1988); Schneeweiss, Hans and Hans Mathes, "Factor Analysis and Principal Components," Journal of Multivariate Analysis 55, 105-124 (1995); Chan, Louis K. C, Jason J. Karceski and Josef Lakonishok, "The Risk and Return from Factors," Journal of Financial and Quantitative Analysis 33/2, 159-188 (1998). All of the above citations are incorporated entirely herein by reference.

In the embodiment of the invention shown in FIG. 5, a universal trading database (UTD), comprising a universe of securities 435 from which a proxy portfolio can be constructed, contains historical pricing data for each of the securities in the proxy universe 435. The proxy universe 435 can comprise any number of securities, but preferably contains a sufficient number of securities to provide an accurate model for the AMETF portfolio. The number of securities that are sufficient will vary depending on the degree of correlation between the securities in the proxy portfolio and those in the AMETF portfolio. If securities are selected for the proxy universe that are well correlated with the securities in the AMETF portfolio, then fewer securities are required in the proxy universe to accurately model the AMETF.

Step 500 involves a principal components analysis (PCA) of the securities in the proxy universe. FIG. 5A provides more detail into the PCA step 500. Historical price data for an instrument i at a past time t is denoted $P_{i,t}$. In step 502, for every instrument i in the proxy universe 435, the PH computer can compute a log price return $p_{i,t}$ using Equation 1:

$$p_{i,t} = \ln(P_{i,t}) - \ln(P_{i,t-1}) \quad \text{(Equation 1)}$$

where $P_{i,t}$ denotes the price of instrument i at time t, and $P_{i,t-1}$ denotes the price of instrument i at the previous fixed interval, time t−1. The price $P_{i,t}$ of instrument i can be based on the ask price, the bid price, the midpoint price, or any other measure of the price at time t, although the basis for the price is preferably the same for every instrument in the proxy universe. If the price of instrument i increased between time t−1 and time t, then the log price return $P_{i,t}$ will be positive, whereas if the price decreased, then the log price return will be negative. While the embodiment discussed here employs log price returns, many other functions of the time-dependent prices $P_{i,t}$ can be used as discussed above, for example, percentage returns.

The result of step 502 is a set of log return time series $P_{i,t}$ 504. These log return time series are used to construct a correlation matrix, which measures the degree of correlation among the log returns of the various instruments in the proxy universe. The correlation matrix elements may be calculated in step 506 using Equation 2:

$$c_{i,j} = \frac{(\sum_t p_{i,t} p_{j,t}) - (\sum_t p_{i,t})(\sum_t p_{j,t})}{((\sum_t (p_{i,t})^2 - (\sum_\tau p_{i,t})^2)(\sum_\tau (p_{j,t})^2 - (\sum_\tau p_{j,t})^2))^{1/2}} \quad \text{(Equation 2)}$$

The correlation coefficients $c_{i,j}$ are measures of the degree of correlation between the price fluctuations of instruments i and j both in the proxy universe. A high degree of positive correlation between price fluctuations in i and j is observed if their prices rise and fall at the same times by the same amounts, and this is reflected in a correlation coefficient, $c_{i,j}$, which approaches 1. (Note that if i=j, the correlation coefficient is equal to 1.) Instruments i and j may be negatively correlated: when the price of one rises, the price of the other falls, and vice versa. In this case, the correlation coefficient $c_{i,j}$ approaches −1. If the prices of i and j move independently of one another, then the correlation coefficient approaches 0. In an alternative embodiment, a covariance matrix can be used instead of a correlation matrix without any substantial changes to the subsequent steps. If a covariance matrix is used in any step involving a matrix, then covariance matrices are preferably used in all steps involving matrices.

The correlation coefficients are real and symmetric, that is $c_{i,j} = c_{j,i}$. The correlation matrix is a real $N_U \times N_U$ square matrix (where $N_U$ is the number of securities in the proxy universe), symmetric about the diagonal, with all the diagonal elements equal to 1. It can be orthogonalized in step 509 to produce a set of eigenvalues and orthogonal eigenvectors. The eigenvalues can be used to eliminate some of the eigenvectors in order to simplify some of the remaining steps in a process detailed in the description of FIG. 5B below. For example, a predetermined number of the smallest eigenvalues (and their corresponding eigenvectors) can be eliminated, or a more complex elimination method may be used to eliminate all but those eigenvalue/eigenvector pairs needed to explain some predetermined percent variation in the model.

The principal components of the correlation matrix are computed from the eigenvectors produced in step 509, resulting in orthogonal linear combinations of the log returns $p_{i,t}$ of all the securities in the proxy universe. The principal components can thus be represented as:

$$R_{j,t} = \Sigma_i w_{i,j} p_{i,t}$$

where the $w_{i,j}$ are the relative weights of the log return time series of instrument i in eigenvector j, and are determined from the orthogonalization of the correlation matrix. These principal components are the risk factor time series 510 in this statistical factor model.

The risk factor time series 510 are sent to the fund computer 110, which determines the exposure of the AMETF to the risk factors in step 520. A time series of return data for the AMETF can be constructed by summing the returns for each of the securities in the fund portfolio 115: $F_t = \Sigma_j a_j F_{j,t}$, where $a_j$ is the proportion of instrument j to the entire AMETF, and the sum over the index j is from 1 to $N_F$ (the number of securities in the AMETF portfolio).

Sensitivity coefficients $\hat{\beta}_i$, for the fund can be derived using a linear least squares regression fit of the following equation:

$$F_t = \Sigma_i \beta_i R_{i,t} + \varepsilon_{i,t}$$

where $\varepsilon_{i,t}$ i the error term, the fund time series $F_t$ and each of the risk factor time series $R_{i,t}$ are known, and the regression fit finds an optimal set of sensitivity coefficients $\beta_i$. The regressions minimize the variance $$V(\beta) = \frac{1}{N-1} \Sigma_t \varepsilon_{i,t}^2$$

where N is the number of historical price data points, and is the maximum value of the index t. The minimizations yield an optimal risk factor vector $\hat{\beta}$ with components $\hat{\beta}_i$. Each of the $\hat{\beta}_i$ estimates the exposure of the AMETF to risk factor $R_i$. Any other method of extracting the sensitivity coefficients may be used, but linear least squares regression is fast and has been found to perform well. The result is a fund factor model, in which the fund can be modeled at any time t using Equation 3:

$$M_t = \Sigma_j \hat{\beta}_j R_{j,t} \quad \text{(Equation 3)}$$

where $R_{j,t} = \Sigma_i w_{i,j} p_{i,t}$ is based on the log returns $p_i$ of securities in the proxy portfolio, the known weights $w_{i,j}$ of the proxy securities i in the risk factor j, and the estimated sensitivity of the fund to risk factor j, $\hat{\beta}_j$.

The step of determining the exposure of the AMETF to the risk factors in this statistical factor model is almost identical to the same step in the economic factor model. The difference is that, generally, the number of risk factors $R_i$ in this statistical model is typically many times greater than the number of risk factors in the economic model. This greater number of risk factors provides the benefit of a more detailed and accurate model at the expense of a more complex model and risk factors with less intuitive meaning. But in both models a simple regression can provide sensitivity coefficients $\hat{\beta}_i$ which estimate the exposure of the fund to the risk factors.

Another difference between the economic model and the statistical model arises in the step of determining the composition of a proxy portfolio. While the economic model performed another regression to calculate weighting coefficients for the securities in the proxy universe that would result in substantially the same sensitivity coefficients as the AMETF, the statistical model can instead involve a simple algebraic combination of the risk factors and fund sensitivity coefficients to arrive at a proxy portfolio. The proxy portfolio 445 may be calculated using the sensitivity coefficient weighted eigenvectors of the correlation matrix. If the total amount of money invested in the fund to be modeled is M, and $P_j$ is the price of security $S_j$ in the proxy universe, then the number of shares of security $S_j$ in the proxy portfolio is given by $Mw_j/P_j$, where $w_j = \Sigma_i \hat{\beta}_i w_{i,j}$. Accordingly, the proxy portfolio is given by:

$$\text{Proxy Portfolio} = \sum_i \sum_j = \frac{M \hat{\beta}_i \hat{w}_{i,j} S_j}{P_j}$$

The proxy portfolio can thus be seen to be a linear combination of securities $S_j$, which are members of the proxy universe, with the weight of each security $S_j$ in the proxy portfolio given by $w_j$. The proxy portfolio can be used to calculate an intra-day value proxy for the AMETF, which can be publicized throughout the day, as in the previous embodiments.

In an alternative embodiment shown in FIG. 5B, the risk model factors are computed using a multi-stage PCA process 500. As before, a universe of proxy securities 435 is selected from which the proxy portfolio will be constructed. In this embodiment, however, the securities in the proxy universe 435 are initially sorted in step 550 according to some correlation, either presumed or calculated. For example, there are often well-recognized correlations between stocks of companies in similar industrial sectors. Thus one possible initial sorting would group the securities for each distinct industry together. In one embodiment, an initial culling step can be used to eliminate securities from the proxy universe that were not traded enough during the period from which the historical pricing data was obtained by setting a predetermined threshold trading level, and only keeping those securities that had trading activity above that threshold trading level during the historical pricing data period.

A preferred embodiment uses the correlation coefficients calculated in Equation 2 to determine which returns of which securities are well correlated, and to group the relatively highly correlated securities together. The securities in each group 555 can be designated now by two indicies, $S_{j,k}$, which indicates the jth security in the kth group of securities. If $N_k$ is the number of securities in group k, then $\Sigma_k N_k = N_u$ (the number of securities in the proxy universe), where the sum over k is from 1 to $N_g$, the number of groups of securities. The result of the grouping thus results in a plurality of grouped securities, $S_{j,k}$, which are subsets 555 of the proxy universe 435.

Principal components analysis is performed for each subset of securities 555 to find the eigenvalues and eigenvectors for each subset. Correlation coefficients are computed according to Equation 2, but only correlations within each subset of securities are computed (i.e., no cross-subset correlations are calculated in this step). Correlation matrices for each subset are then orthogonalized in step 560, and the eigenvectors and eigenvalues for each subset are determined 562.

In order to simplify subsequent calculations, a number of eigenvectors may be eliminated from subsequent calculations by recognizing that the apparent correlation between the returns of two securities in a subset may be too small to be a reliable measure of any actual correlation. In step 563, the $N_k$ eigenvalues for each subset & may be organized in decreasing order, starting with the greatest, to form a series $\lambda_1 > \lambda_2 > \ldots > \lambda_{Nk-1} > \lambda_{Nk}$. Next, some of the smaller eigenvalues can be eliminated according to Equation 4:

$$\lambda_1 + \lambda_2 + \ldots + \lambda_{j\,max} \geq V^* N_k \quad \text{(Equation 4)}$$

where V is a preselected percent variation. To account for, say, 60% of the variation in the returns, V would be set to 0.6. The eigenvalues smaller than $\lambda_{j\,max}$ can be discarded, and their corresponding eigenvectors can also be discarded and need not be used in subsequent calculations.

Eliminating the smaller eigenvalues provides a simplification of the subsequent calculations with a minimal effect on the results because the eliminated eigenvalues correspond to eigenvectors that would not be expected to have an influence on returns correlations above the random "noise" price fluctuations. By first grouping subsets of securities into correlated groups, it is expected that most of the eigenvalues (and their corresponding eigenvectors) can be eliminated in this culling step 563, and thus subsequent calculations using the factors can be vastly simplified by reducing the dimensionality of the problem for the regression steps. Alternatively, a predetermined number of eigenvectors corresponding to the largest eigenvalues can be selected, and all eigenvectors with corresponding eigenvalues smaller than the smallest eigenvalue from the predetermined number can be eliminated, or any other alternative methods for reducing the dimensionality of the subsequent PCA steps may be used.

The PCA 560 and ordering and culling 563 steps results in subset principal components 565 given by $f_{j,t} = \Sigma_i w_{i,j} p_{i,t}$, as before, except now the number of principal components is greatly reduced by the culling processes. In this equation for the reduced set of principal components, j ranges from 1 to the number of eigenvectors that survived the culling process across all subsets 555. (Yet each principal component is still a linear combination of all of the securities in the proxy universe.) In order to eliminate any cross-correlations among the reduced set of eigenvectors 565, a second level of principal components analysis is performed in step 570. This time, the PCA analyzes correlations among all the surviving principal components in the reduced set 565. The correlation matrix elements are given by Equation 5:

$$c_{i,j} = \frac{\left(\sum_t f_{i,t} f_{j,t}\right) - \left(\sum_t f_{i,t}\right)\left(\sum_t f_{j,t}\right)}{\left(\left(\sum_t (f_{i,t})^2 - \left(\sum_\tau f_{i,t}\right)^2\right)\left(\sum_t (f_{j,t})^2 - \left(\sum_\tau f_{j,t}\right)^2\right)\right)^{1/2}}$$ (Equation 5)

and they measure the degree of correlation between principal component i and principal component j. Note that many of these correlation matrix elements will be zero, namely the correlation matrix elements between principal components from the same subsets, because they involve correlation functions between orthogonal principal components resulting from a previous correlation matrix orthogonalization.

The eigenvalues from the orthogonalization of the matrix given by Equation 4 can be organized in decreasing order, as before, and many of the smaller eigenvalues (and their corresponding eigenvectors) can be eliminated from subsequent calculations. This culling step 572 can be based on some preselected percent variation, as before, or it can simply be based on a desire to have no more than a certain number of factors (N) in the subsequent calculations (and thus all of the smaller eigenvalues can be eliminated, leaving only the N largest eigenvalues).

The principal components (risk factors) $R_k$ of the correlation matrix of Equation 5 are orthogonal linear combinations of the previously calculated principal components $f_{j,t} = \Sigma_i w_{i,j} p_{i,t}$.

$$R_{k,t} = \Sigma_j u_{k,j} f_{j,t} = \Sigma_j \Sigma_i u_{k,j} w_{i,j} p_{i,t}$$

where k ranges from 1 to N (the total number of factors surviving both culling steps), and $u_{k,j}$ is a coefficient determined by the orthogonalization of Equation 5 that measures the weight of factor $f_j$ in factor $R_k$. The risk factor time series can be seen to still be linear combinations of the log returns $p_i$, with weighting coefficients $\Sigma_j u_{k,j} w_{i,j}$. These risk factor time series 510 can be used as before in step 520 to estimate the fund sensitivity coefficients $\hat{\beta}_k$, and in step 540 to produce a proxy portfolio that is a linear combination of the securities $S_i$ in the proxy universe:

$$\text{Proxy Portfolio} = \sum_i \frac{M w_i S_i}{P_i}$$

where each weighting coefficient $w_i = \Sigma_k \Sigma_j \hat{\beta}_k u_{k,j} w_{i,j}$ the proportion of security $S_i$ from the proxy universe in the proxy portfolio, M is the total amount invested in the fund modeled, and $P_i$ is the price of security $S_i$. This proxy portfolio can be used to calculate an intra-day value proxy for the AMETF, which can be publicized throughout the day as in the previously described embodiments.

The proxy portfolio may be used in place of the AMETF to derive a hedging portfolio, for example, by running the proxy portfolio through a model to determine an appropriate hedging portfolio. Alternatively, a method such as that shown in FIG. 6 may be used to create a hedging portfolio.

FIG. 6 shows a method that can be used to generate a hedging portfolio for an AMETF based on a risk factors generated using any of the preceding methods. This method can use securities from a limited hedging universe 600. The securities in the hedging universe can be selected according to criteria that are desirable in a hedging portfolio, such as liquidity and low risk. In a preferred embodiment, individual liquidity providers who use the systems of the inventions can specify their own individual hedging universes 600, and individualized hedging portfolios 350 can be constructed using securities selected from the individual hedging universes 600.

Time series of risk factors are constructed according to any method for constructing time series of risk factors, such as principal components analysis based on log return data, as described above. Preferably, the time series of risk factors is constructed from securities in a proxy universe, which may generally comprise a larger set of securities than the hedging universe. The exposure of the AMETF to the risk factors is determined, resulting in a set of sensitivity coefficients from which a fund factor model $M_t = \Sigma_j \hat{\beta}_j R_{j,t}$ can be constructed in terms of the sensitivity coefficient estimates $\hat{\beta}_j$ and the factor time series $R_{j,t}$, which are linear combinations of time series returns of securities in the proxy universe.

Step 615 is a calculation for finding a the risk characteristics of each security in the hedging universe in order to develop a hedging portfolio with substantially the same sensitivity coefficients to the factors as the AMETF. This step may involve computing historical return data for each of the securities in the hedging universe, for example, $r_{i,t}$, which is the log price return for security $H_i$ in the hedging universe at time t. Step 615 can be accomplished by the regression analysis of the following equation to produce a set of weighting coefficients $\hat{w}_{i,j}$:

$$R_{j,t} = \Sigma_i w_{i,j} r_{i,t} + \varepsilon_{j,t}$$

where $\varepsilon_{j,t}$ is the error term, and $R_{j,t}$ is risk factor j at time t. The regression minimizes the variance:

$$V(w_{i,j}) = \frac{1}{N-1} \sum_t \varepsilon_{j,t}^2$$

Each weighting coefficient $\hat{w}_{i,j}$ measures the exposure of security $H_i$ to risk factor $R_j$. The resulting set of hedging universe risk characteristics $\hat{w}_{i,j}$ 620 provides information sufficient to produce a hedging portfolio from the securities in the hedging universe:

$$\text{Hedging Portfolio} = \sum_j \sum_i \frac{M}{P_i} \hat{\beta}_j \hat{w}_{i,j} H_i = \sum_i \frac{M}{P_i} \hat{w}_i H_i$$

where each weighting coefficient $\hat{w}_i = \Sigma_j \hat{\beta}_j \hat{w}_{i,j}$ is the proportion of security $H_i$ from the hedging universe in the hedging portfolio, M is the total amount invested in the fund modeled, and $P_i$ is the price of security $H_i$. This hedging portfolio may be used by liquidity providers and others to hedge investment risks involving the AMETF without providing information about the assets underlying the AMETF, and this portfolio may also be used to provide an intra-day value proxy for the AMETF. Alternatively, the proxy portfolio may be used to calculate an intra-day value proxy for the AMETF as before.

The set of weighting coefficients $\hat{w}_i$ is not necessarily unique. There are potentially many hedging portfolios that can be constructed from the same hedging universe that all have substantially the same exposure to the same risk factors as the AMETF and can thus track the AMETF. However, certain sets of weighting coefficients, and hence certain hedging portfolios, may be more desirable than others because they may provide substantially the same average returns with less risk, i.e., less variability of returns. Thus, the hedging portfolio is preferably optimized in a subsequent risk minimization step.

A risk minimization procedure, step 640, can be used to improve the hedging portfolio by altering the composition of the hedging portfolio to achieve substantially the same returns as the hedging portfolio with less risk. There are various combinations of assets in a portfolio that can give the same expected rate of return. Mean-variance optimization is a technique that adjusts the combination of assets in a portfolio to either maximize the return for a given level of risk, or minimize the risk for a given level of return (or anything in between). Several commercial software packages exist for mean-variance optimization, and the details of such calculations are known to those skilled in the art.

The risk minimization step 640 requires input in the form of the hedging universe risk characteristics 620, historical return data for all of the securities comprising the hedging portfolio (i.e., the securities in the hedging universe), a proxy portfolio 645, and historical return data from the same period for all of the securities comprising the proxy portfolio. The process calculates the standard deviation of returns for each security in the hedging portfolio as a measure of the risk for each security, as well as a correlation matrix of returns between all securities in the hedging portfolio.

Based on the risks associated with each of the securities and the correlations between the returns of each of the securities, the risk minimization provides a set of portfolios with substantially the same average returns as the proxy portfolio 645 and comprise the same securities as the hedging universe 600, weighted by weighting factors $\hat{W}_i$. An optimized hedging portfolio 650 is selected from the set of possible output portfolios expected to achieve substantially the same returns as the proxy portfolio 645 (and hence also of the AMETF itself), and with the same risk as the proxy portfolio 645, and hence less risk that the returns of the optimized hedging portfolio 650 will deviate from the returns of the AMETF. This optimized hedging portfolio 650 may be provided to liquidity providers and others who wish to use it to hedge their risks trading AMETF shares. A benefit of this embodiment is the ability to calculate a hedging portfolio that can accurately track an AMETF portfolio based on a proxy portfolio, and without requiring any disclosure of the actual AMETF portfolio.

The various calculations and methods described above can be performed on any computer by any person, limited only by the extent to which the fund company wants to keep the AMETF portfolio secret. If disclosure to a trusted third party is acceptable, than many of the calculations can be performed on the third party computer after certain basic precautions including, for example, encryption of the AMETF portfolio before sending it to the third party. If disclosure outside of the fund company is unacceptable, than the calculations to determine the exposure of the AMETF to the risk factors should be performed on a computer system internal to the fund company. In this embodiment, the fund company (fund manager or fund custodian) may select the parameters for the model. Also, selection of a proxy universe and calculation of the risk factors in the proxy universe can be done by a computer system internal to the fund company, or by an external computer system. Calculation of a hedging portfolio can likewise be performed on a computer system internal or external to the fund company. Furthermore, any or all of the calculations may be performed on either a single computer, or multiple computers, possibly networked together, and thus any computer means may be used to perform any or all of the calculations.

The invention provides computer software for performing any or all of the processes and steps described herein. The computer software may be divided into component programs for performing the various operations described herein, operable together across networked computer systems. For example, the software may include a component program for assembling a proxy universe and calculating risk factors, a separate component program for determining the exposure of an AMETF to risk factors, another component for constructing a proxy portfolio, another component for determining an intra-day value proxy, and another component for constructing a hedging portfolio and an optimized hedging portfolio. The computer software of the invention may be stored on any data storage device, including but not limited to, hard drives, floppy disks, CD-ROMs, CD-RWs, DVDs, and solid state storage devices, such as smart media.

The invention includes systems for performing PCA calculation processes for creating intra-day value estimates, proxy portfolios, and hedging portfolios based on AMETF portfolios. The systems may include software programs for performing the PCA calculations that allow user inputs. The user inputs can allow a user to back-test a model of a particular fund to determine the optimal set of parameters for the fund model. A user may then adjust the user inputs to generate a model with a first set of parameters, diagnose the model by determining tracking errors and variances of the model from actual historical fund performance, then adjust the parameters with the user inputs to improve the model. The user inputs may include, for example, the number of principal components retained at one or more stages of PCA analysis, the percentage variation to be explained by the principal components retained at one or more stages of PCA analysis, the frequency of historical data to be used in generating the model, and the age of the data used in the modeling. Other adjustments may be made to such parameters as the returns functions (e.g., log returns, percent returns, etc.), which may be subject to an exponential or other weighting factor, for example, to favor more recent historical pricing data over older pricing data, which may be less relevant. Other adjustments to calculation parameters may affect the size of aggregation buckets, database minimum data density requirements, banding time (to reduce spurious data), the number of returns used to build the model, the type of weighting (linear, exponential, etc.), the percent variation used for eigenvalue and factor culling, and the total number of factors to be used in the model. These user inputs may be adjusted using dials or slides, for example, in a graphical user interface (GUI).

The invention further includes any sort of financial instrument based on or derived from the AMETFs described herein. The invention thus includes options contracts, futures contracts, or any other derivative instruments based on the funds of the invention.

While the above description has discussed the application of the systems and methods of the invention to AMETFs, it will be apparent to those skilled in the art that the invention has much broader applicability. Broadly, the invention includes systems and methods for modeling the behavior of one set of securities using a different set of securities or any other representative indicators. Applications of the invention include, for example, improved security measures for mutual funds. Currently, institutional investors who wish to ensure that their mutual fund's manager is investing in a particular type of securities must hire an independent third party consultant to monitor the fund portfolio. But disclosures of fund holdings, even to independent third parties, may result in loss of fund secrecy. Using the methods of the invention, a fund manager may provide an indicative proxy (or hedging) portfolio calculated using the systems and methods of the invention, rather than disclosing the actual mutual fund holdings. Using such an indicative proxy or hedging portfolio will reduce the likelihood of disclosure of the fund assets.

Furthermore, while some of the systems and methods of the invention involve the factor models described above, others may involve different mathematical techniques to find a set of securities (or other indicators) to model the performance of a fund. For example, known Monte Carlo methods can be used to select a set of securities to model the performance of a fund. The invention thus includes any systems or methods involving any sort of technique for modeling fund performance, where the intra-day value of the model fund substantially tracks the intra-day value of the fund modeled over the course of at least one trading day.

EXAMPLES

Example 1

To test the risk factor model for a variety of portfolios, nine simulated AMETF portfolios were constructed to represent nine different approaches to fund management. Investment securities were selected from three groups: small-cap, mid-cap, and large-cap. Within each group, securities were selected to build simulated AMETFs structured for growth, value, or a blend. Thus, the nine portfolios consisted of each of the nine combinations of the three types of securities (growth, value, blend) from the three groups (small-cap, mid-cap, large-cap). Each of the nine portfolios held between 50-100 securities. To simulate active management, a maximum of a 10% daily turnover of fund holdings was applied to each of the simulated AMETFs. The intra-day values of the simulated AMETF portfolios were calculated in 10 minute intervals throughout each trading day during the year 2001 based on the historical price data from that period.

Nine proxy portfolios were constructed using a principal components analysis as shown in FIGS. 5, 5A, and 5B, based on the simulated AMETF portfolios using historical pricing data from before the time period of the simulation. The proxy portfolios were updated on a daily basis to reflect the simulated daily turnover of assets in the simulated AMETF portfolios from the previous day. Intra-day value proxies were computed in 10 minute intervals from the proxy portfolios throughout each trading day during 2001 based on the historical price data during that period.

The differences between the actual intra-day values of the AMETFs and the intra-day value proxies were calculated for each 10 minute sampling interval based on the nine simulated AMETF portfolios and the corresponding nine proxy portfolios. A statistical analysis was applied to the value differences. The average value differences and the standard deviations, as well as the greatest deviations, both positive and negative, of the intra-day value proxies from the AMETF values (denoted Maximum and Minimum, respectively) are presented below in Table 1.

TABLE 1

|  |  | Large-Cap |  | Mid-Cap |  | Small-Cap |
|---|---|---|---|---|---|---|
| Growth | Average | −0.019% | Average | −0.039% | Average | 0.032% |
|  | Std. Dev. | 0.256% | Std. Dev. | 0.310% | Std. Dev. | 0.389% |
|  | Maximum | 0.845% | Maximum | 1.171% | Maximum | 1.866% |
|  | Minimum | −1.018% | Minimum | −1.423% | Minimum | −1.487% |
| Value | Average | 0.006% | Average | 0.011% | Average | 0.010% |
|  | Std. Dev. | 0.201% | Std. Dev. | 0.216% | Std. Dev. | 0.307% |
|  | Maximum | 0.878% | Maximum | 0.915% | Maximum | 1.371% |
|  | Minimum | −0.943% | Minimum | −0.727% | Minimum | −1.242% |
| Blend | Average | 0.016% | Average | −0.006% | Average | 0.001% |
|  | Std. Dev. | 0.200% | Std. Dev. | 0.229% | Std. Dev. | 0.256% |
|  | Maximum | 1.045% | Maximum | 1.643% | Maximum | 1.069% |
|  | Minimum | −0.748% | Minimum | −0.901% | Minimum | −1.328% |

From this table, it is evident that the proxy portfolios produce intra-day value proxies that track the actual intra-day values of the AMETF portfolios with remarkable accuracy. The average differences between the intra-day value proxies and the actual intra-day values for an entire year ranged from just 0.001% (Small-Cap Blend) to −0.039% (Mid-Cap Growth). The standard deviations, which measure the risk that the intra-day value proxies will differ from the actual intra-day values at any particular time, range from 0.200% (Large-Cap Blend) to 0.389% (Small-Cap Growth). The standard deviations in the difference between the proxy and actual intra-day values shown above would be of an acceptably low risk, and that the proxy intra-day value could serve as a reliable basis for negotiating prices of AMETF shares. It is noteworthy that the maximum deviations for an entire year of the intra-day value proxies from the actual intra-day values are always less than 2% for each of the nine simulated funds.

Example 2

To demonstrate the accuracy of a risk factor model for a large-cap blend portfolio, a simulated AMETF portfolio was constructed holding between 50 and 100 stocks listed in the S&P 500. To simulate active management, a maximum of a 10% daily turnover of fund holdings was applied to the simulated holdings. The intra-day values of the simulated AMETF portfolio were calculated in 10 minute intervals throughout each trading day during 2001 based on the historical price data during that period.

A proxy portfolio was constructed using a principal components analysis as shown in FIGS. 5, 5A, and 5B, based on the simulated AMETF portfolio using historical pricing data from before the time period of the simulation (the entire 2001 trading year). The proxy universe consisted of the 500 stocks listed in the S&P 500. The proxy portfolio was updated on a daily basis to reflect the simulated daily turnover of assets in the simulated AMETF portfolio from the previous day. An intra-day value proxy was computed in 10 minute intervals from the proxy portfolio throughout each trading day during 2001 based on the historical price data during that period.

A statistical analysis was applied to the intra-day value and intra-day value proxy data generated for the 2001 trading year. The average difference between the intra-day value and intra-day value proxy was only 0.016%, with an acceptably low standard deviation of only 0.200%. A histogram of the results is shown in FIG. 7. These results demonstrate that the returns on the proxy portfolio very accurately tracked the returns on the simulated AMETF portfolio throughout all of the periods measured. The intra-day value proxy provided an adequate substitute for the actual intra-day value of the simulated AMETF.

To demonstrate that the proxy portfolio does not give sufficient information to infer the actual AMETF portfolio, Table 2 provides a comparison between the top 10 holdings of the simulated AMETF and the proxy portfolio on the same day.

TABLE 2

| Top 10 Holdings in AMETF | | | Top 10 Holdings in Proxy Portfolio | | |
|---|---|---|---|---|---|
| Symbol | Name | Weight | Symbol | Name | Weight |
| WPI | Watson Pharm. | 3.92% | CNC | Conseco Inc. | 1.05% |
| TXU | TXU Corp. | 2.96% | APC | Anadarko Petroleum | 1.02% |
| TGT | Target Corp. | 2.81% | APA | Apache Corp. | 0.94% |
| IMNX | Immunex Corp. | 2.67% | SFA | Scientific-Atlanta | 0.85% |
| AHC | Amerada Hess | 2.53% | EOG | EOG Resources | 0.85% |
| CA | Computer Associates | 2.37% | BR | Burlington Resources | 0.83% |
| EDS | Elec. Data Systems | 2.32% | RKY | Adolf Coors | 0.81% |
| ED | Consolidated Edison | 2.21% | VZ | Verizon Comm. | 0.81% |
| PLP | Phillips Petroleum | 2.21% | BUD | Anheuser-Busch | 0.78% |
| CSX | CSX Corp. | 2.17% | KMG | Kerr-McGee | 0.76% |
| | Total | 26.16% | | Total | 8.69% |
| | Total Number of Holdings | 84 | | Total Number of Holdings | 474 |

As can be seen from Table 2, there is no overlap between the top 10 holdings of the AMETF portfolio and the proxy portfolio in this case. Thus, while the proxy portfolio can accurately track the AMETF portfolio, it does not provide sufficient information to infer the AMETF holdings.

As a further demonstration of the ability of the proxy portfolio to track the AMETF portfolio throughout the trading day, a proxy portfolio was constructed from a simulated AMETF and the intra-day value of the proxy portfolio was compared to the intra-day value of the AMETF throughout the trading day. FIG. 8 shows the results. The average difference between the NAV proxy and the actual NAV was only 0.011%, with a very small standard deviation of 0.046%. The top 10 holdings of the proxy portfolio and the AMETF portfolio are provided in Table 3.

TABLE 3

| Top 10 Holdings in AMETF | | | Top 10 Holdings in Proxy Portfolio | | |
|---|---|---|---|---|---|
| Symbol | Name | Weight | Symbol | Name | Weight |
| RX | IMS Health Inc. | 2.86% | RX | IMS Health Inc. | 1.82% |
| MCD | McDonald's Corp. | 2.68% | PVN | Providian Financial | 1.53% |
| NSC | Norfolk Southern | 2.59% | NWL | Newell Rubbermaid | 1.34% |
| EK | Eastman Kodak | 2.57% | CCU | Clear Channel Comm. | 1.15% |
| GE | General Electric | 2.48% | AVP | Avon Products Inc. | 1.11% |
| CINF | Cincinnati Financial | 2.41% | GWW | WW Grainger Inc. | 1.08% |
| DVN | Devon Energy | 2.27% | SYY | Sysco Corp. | 0.97% |
| AGN | Allergan | 2.10% | HDI | Harley-Davidson Inc. | 0.97% |
| CHIR | Chiron | 2.06% | MYG | Maytag Corp | 0.94% |
| BFB | Brown-Forman | 2.03% | MCD | McDonald's Corp. | 0.93% |
| | Total | 24.04% | | Total | 11.83% |
| | Total Number of Holdings | 75 | | Total Number of Holdings | 432 |

While there are two stocks in common in the top 10 holdings of the AMETF and proxy portfolios (IMS Health and McDonald's), the percentages of these stocks held in the two portfolios is very different, and the other holdings are also different. The information in the proxy portfolio is still insufficient to infer the holdings of the AMETF, yet as demonstrated by FIG. 8, the intra-day value tracking is extremely accurate.

Example 3

This example demonstrates a method of the invention for constructing a hedging portfolio according to the method shown in FIG. 6, that accurately tracks an AMETF portfolio using the same set of AMETF portfolio and proxy portfolio used in Example 1. A hedging universe of securities that may be selected for the hedging portfolio was chosen from the 80 largest holdings from the proxy portfolio and four exchange traded funds: SPDR Trust (SPY), MidCap SPDR Trust (MDY), Nasdaq 100 Index (QQQ), and the iShares Russell 2000 Index Fund (IWM).

A hedging portfolio was created by applying the fund factor model calculated by regression of the AMETF portfolio onto the orthogonal factors calculated with the PCA methods of FIG. 5. The hedging portfolio was subjected to risk minimization to provide an optimized hedging portfolio that tracks the returns given by the proxy portfolio by adjusting the proportions of the securities in the hedging portfolio to minimize the variance of the holdings while maintaining the same average returns. An example comparing the top 10 holdings of the hedging portfolio to the top 10 holdings of the AMETF is provided in Table 4.

TABLE 4

| Top 10 Holdings in AMETF | | | Top 10 Holdings in Hedging Portfolio | | |
|---|---|---|---|---|---|
| Symbol | Name | Weight | Symbol | Name | Weight |
| RX | IMS Health Inc. | 2.86% | SPY | S&P 500 ETF | 50.00% |
| MCD | McDonald's Corp. | 2.68% | MDY | S&P 400 ETF | 27.73% |
| NSC | Norfolk Southern | 2.59% | BR | Burlington Resources | 3.62% |
| EK | Eastman Kodak | 2.57% | AVP | Avon Products | 2.73% |
| GE | General Electric | 2.48% | EK | Eastman Kodak | 2.13% |
| CINF | Cincinnati Financial | 2.41% | PVN | Providian Financial | 2.08% |
| DVN | Devon Energy | 2.27% | SEE | Sealed Air | 2.07% |
| AGN | Allergan | 2.10% | RX | IMS Health Inc. | 2.05% |
| CHIR | Chiron | 2.06% | SANM | Sanmina-Sci | 1.97% |
| BFB | Brown-Forman | 2.03% | DCN | Dana Corp. | 1.95% |
| | Total | 24.04% | | Total | 96.32% |
| | Total Number of Holdings | 75 | | Total Number of Holdings | 39 |

The vast majority of the hedging portfolio is comprised of shares of the two S&P index funds, which are not AMETF holdings. While there are two stocks in common with the AMETF (IMS Health and Eastman Kodak), these are held in very different proportions in the hedging portfolio, and there are no other stocks in common in the top 10 holdings. Furthermore, it is notable that the hedging portfolio contains fewer holdings than the AMETF or the proxy portfolio (39 versus 75 or 432), which should greatly reduce transaction costs should the securities underlying the hedging portfolio need to be sold individually.

FIG. 9 provides a demonstration of the accuracy of the hedging portfolio in tracking the intra-day value of the AMETF portfolio (and the proxy portfolio) throughout a trading day. The average difference between the AMETF intra-day value and the hedging portfolio intra-day value was only 0.054%, with a standard deviation of only 0.070%. This should be an acceptably small difference and risk for hedging purposes.

While the embodiments described above provide illustrations and examples of the systems and methods of the invention, the invention should not be considered at all limited to these embodiments.

The invention claimed is:

1. A computer-implemented method of intra-day transacting in constituents of a first data set without revealing the constituents, the method comprising:
in at least one computer of a trusted system comprising a physical hardware and operating system configuration comprising domain configuration and trust relationships that control access to a decrypted portfolio file representing positions taken in an actively managed fund, the at least one computer having non-transitory memory storing computer software and at least one processor executing the computer software, thereby causing the at least one computer to perform the steps of:
receiving, from a fund computer, the first data set in an encrypted format, the first data set defining the actively managed fund having constituents, the constituents comprising fund assets;
decrypting the first data set based on the domain configuration and trust relationships;
generating a second data set defining a basket of instruments that tracks one or more characteristics of the decrypted first data set, the second data set being non-determinative of the first data set, said generating comprising a statistical factor model method involving an a priori calculation of model factors based on historical price data;
initiating, responsive to input, one or more transactions involving the basket of instruments defined by the second data set such that neither the basket of instruments nor the one or more transactions reveals at least one of the group consisting of the fund assets and changes in the fund assets defined by the first data set, said one or more transactions resulting in a modification of at least one of the one or more characteristics of the first data set; and
initiating, responsive to further input, one or more intra-day transactions, the one or more intra-day transactions involving the constituents in accordance with the modified characteristics of the first data set.

2. The method of claim 1, wherein pricing of the one or more intra-day transactions comprises negotiated pricing between buyers and sellers of shares in or derivative instruments of the actively managed fund.

3. The method of claim 1, wherein the basket of instruments comprises at least one of a creation basket portfolio and a redemption basket portfolio.

4. The method of claim 1, wherein the value of the basket of instruments tracks a value of the actively managed fund.

5. The method of claim 4, further comprising:
executing, by the at least one computer, a process to produce an offsetting portfolio including the basket of instruments; and
offsetting a position taken in the actively managed fund using the offsetting portfolio.

6. The method of claim 5, wherein the process to produce the offsetting portfolio comprises a factor analysis process.

7. The method of claim 6, wherein the factor analysis process includes analyzing factors related to at least one of economic activity and inflation rates.

8. The method of claim 1, wherein the fund assets further comprise at least one of fund shares and derivative instruments.

9. The method of claim 8, wherein pricing of the fund shares or derivative instruments is derived from a calculated intra-day net asset value proxy for the actively managed fund.

10. The method of claim 1, further comprising:
determining, by the at least one computer, an intra-day net asset value proxy for the actively managed fund by applying prices received from a quote feed to constituents in the actively managed fund as of a closing of a prior trading day.

11. The method of claim 10, wherein determining the intra-day net asset value proxy occurs in the trusted system that comprises the at least one computer.

12. The method of claim 1, wherein the one or more characteristics of the first data set include at least one of values, returns, and risk characteristics.

13. A computer-implemented method of intra-day transacting in first constituents of a first data set without revealing the first constituents of the first data set, the method comprising:
in at least one computer of a computer system having non-transitory memory storing computer software and at least one processor executing the computer software, thereby causing the at least one computer to perform the steps of:

receiving, from a fund computer, the first data set in an encrypted format, the first data set defining an actively managed fund and having the first constituents that comprise fund assets of the actively managed fund;

decrypting the first data set based on pre-established trust relationship;

determining an intra-day net asset value proxy for the decrypted first data set by applying prices received from a quote feed to second constituents of a second data set that tracks one or more characteristics of the decrypted first data set, the second constituents being different from and non-determinative of the first constituents, said second data set generated via a statistical factor model method involving an a priori calculation of model factors based on historical price data, such that the intra-day net asset value proxy does not reveal at least one of the group consisting of the fund assets and changes in the fund assets; and initiating, responsive to input, one or more intra-day transactions involving the first constituents based on negotiated pricing of the first constituents derived from the intra-day net asset value proxy.

14. The method of claim 13, wherein the one or more intra-day transactions occurs on a financial exchange or market entity comprising the at least one computer.

15. The method of claim 13, wherein the one or more intra-day transactions occurs through at least one of a specialist computer of a specialist and a market maker computer of a market maker, the method further comprising:

determining, by the at least one computer, a basket of instruments that tracks one or more characteristics of the first data set, and offsetting, by at least one of the specialist computer and the market maker computer, one or more positions in the first data set taken by at least one of the specialist and the market maker using the determined basket of instruments.

16. The method of claim 15, wherein the determined basket of instruments includes one or more last reported fund holdings of the actively managed fund.

17. The method of claim 15, wherein the basket of instruments comprises at least one of a creation basket portfolio and a redemption basket portfolio.

18. The method of claim 15, wherein the one or more intra-day transactions occur in fund shares through at least one of the specialist computer and the market maker computer and the one or more positions are taken in the actively managed fund.

19. The method of claim 15, wherein intra-day transacting occurs in derivative instruments through at least one of the specialist computer and the market maker computer and the one or more positions are taken in derivatives.

20. The method of claim 15, wherein the one or more characteristics of the first data set includes at least one of values, returns, and risk characteristics.

21. The method of claim 13, wherein the step of determining the intra-day net asset value is executed within a trusted system that comprises the at least one computer, the method further comprises:

adjusting, by the at least one computer, the actively managed fund to reflect any transactions made on a prior trading day to take into consideration dividend credits and expenses attributable to a current trading day.

22. The method of claim 21, wherein the trusted system comprises a physical hardware and operating system configuration in which domain configuration and trust relationships are established to control access to a decrypted portfolio file representing positions taken in the actively managed fund.

23. The method of claim 13, wherein the step of determining the intra-day net asset value is executed within a trusted system that comprises the at least one computer, the method further comprises:

disseminating, by the at least one computer, the intra-day net asset value proxy for the actively managed fund.

24. The method of claim 23, wherein the intra-day net asset value proxy is disseminated at one or more predetermined times during one or more trading days.

25. The method of claim 13, wherein the fund assets further comprise at least one of fund shares and derivative instruments.

26. A computer-implemented method of intra-day transacting on an exchange or market in constituents of a data set without revealing the constituents of the data set, the method comprising:

in at least one computer of a computer system having non-transitory memory storing computer software and at least one processor executing the computer software, thereby causing the at least one computer to perform the steps of:

receiving, from a fund computer, the data set in an encrypted format, the data set defining an actively managed fund and having the constituents that comprise fund assets of the actively managed fund;

decrypting the data set based on a pre-established trust relationship;

determining an intra-day net asset value proxy for the decrypted data set such that the intra-day net asset value proxy for the decrypted data set does not reveal and is non-determinative of at least one of the group consisting of the fund assets of the actively managed fund and changes in the fund assets of the actively managed fund, said intra-day net asset value proxy determined from a further data set that is generated via a statistical factor model method involving an a priori calculation of model factors based on historical price data, the further data set tracking one or more characteristics of the decrypted data set;

publishing the intra-day net asset value proxy;

establishing prices for the constituents of the data set through negotiated pricing of the constituents by buyers and sellers of the constituents of the actively managed fund derived from prices posted for the determined intra-day net asset value proxy for the actively managed fund; and initiating, responsive to input, at least one intra-day transaction on the exchange or the market involving the constituents and the established prices for the constituents.

27. The method of claim 26, further comprising:

executing, by the at least one computer, a factor analysis process to produce a portfolio that tracks the actively managed fund to offset positions taken by participants that transact in the constituents of the data set.

28. The method of claim 27, wherein the portfolio comprises at least one of a creation basket portfolio and a redemption basket portfolio.

29. The method of claim 27, wherein the at least one intra-day transaction occurs through at least one of a specialist computer and a market maker computer configured to offset positions using the determined portfolio.

30. The method of claim 26, wherein the intra-day net asset value proxy is determined by applying prices received from a quote feed to the constituents of the actively managed fund as of a closing of a prior trading day.

31. The method of claim 26, wherein the step of determining the intra-day net asset value proxy occurs in a trusted computer system that comprises the at least one computer.

32. The method of claim 26, wherein the fund assets further comprise at least one of fund shares and derivative instruments.

* * * * *